(12) United States Patent  
Kley

(10) Patent No.: US 7,784,107 B2
(45) Date of Patent: Aug. 24, 2010

(54) HIGH SPEED MEASUREMENT, ANALYSIS AND IMAGING SYSTEMS AND METHODS FOR LENGTH SCALES FROM METER TO SUB-NANOMETER

(75) Inventor: Victor B. Kley, 1119 Park Hills Rd., Berkeley, CA (US) 94708

(73) Assignee: Victor B. Kley, Berkeley, CA (US)

( * ) Notice: Subject to any disclaimer, the term of this patent is extended or adjusted under 35 U.S.C. 154(b) by 321 days.

(21) Appl. No.: 11/757,245

(22) Filed: Jun. 1, 2007

(65) Prior Publication Data
US 2008/0135750 A1 Jun. 12, 2008

Related U.S. Application Data

(60) Provisional application No. 60/803,804, filed on Jun. 2, 2006.

(51) Int. Cl.
*G01N 23/00* (2006.01)
*G21K 7/00* (2006.01)
(52) U.S. Cl. .................. 850/4; 850/1; 850/3; 850/62; 850/63; 250/306; 250/307
(58) Field of Classification Search .................. 850/1, 850/3, 4, 62, 63
See application file for complete search history.

(56) References Cited

U.S. PATENT DOCUMENTS 3,955,179 A * 5/1976 Planke ........................ 382/142

(Continued)

FOREIGN PATENT DOCUMENTS
EP 0932020 A1 7/1999

(Continued)

OTHER PUBLICATIONS

Chang Liu, Assistant Professor (bio), University of Illinois at Urbana-Champaign.

(Continued)

*Primary Examiner*—David A Vanore
(74) *Attorney, Agent, or Firm*—Townsend and Townsend and Crew LLP

(57) ABSTRACT

An system for the measurement, analysis, and imaging of objects and surfaces in a variety of sizes is provided. In the most general terms, the invention relates to a device capable of measuring an object using a combination of low-resolution optical, high-resolution optical, SPM/AFM and/or material analysis techniques. The data gathered at various resolutions is correlated to absolute locations on the object's surface, allowing selected regions of the object's surface to be analyzed to any desired degree of precision (down to atomic scale). In a specific embodiment of the present invention, a system for collecting measurement data regarding an object of interest is disclosed. The system includes a sample stage adapted to hold the object of interest. The system further includes an optical lens assembly disposed above the sample stage. The optical lens assembly is configured to capture an optical image of the object of interest. The system additionally includes a Scanning Probe Microscope (SPM) assembly having a probe tip. The SPM assembly is configured coaxially with the optical lens assembly. In addition, the system includes a positioning system configured to position the optical lens assembly and the SPM assembly with respect to the object of interest held on the sample stage. The probe tip of the SPM assembly is visible within the optical image obtained by the optical lens assembly.

8 Claims, 32 Drawing Sheets

U.S. PATENT DOCUMENTS

| | | | |
|---|---|---|---|
| 4,403,834 A | 9/1983 | Kley | |
| 4,435,616 A | 3/1984 | Kley | |
| 4,456,731 A | 6/1984 | Caporossi et al. | |
| 4,558,359 A * | 12/1985 | Kuperman et al. | 348/44 |
| 4,561,731 A | 12/1985 | Kley | |
| 4,589,030 A | 5/1986 | Kley | |
| 4,604,648 A * | 8/1986 | Kley | 348/131 |
| 4,773,029 A * | 9/1988 | Claesson et al. | 702/167 |
| 4,782,327 A | 11/1988 | Kley et al. | |
| 4,806,776 A | 2/1989 | Kley | |
| 4,845,373 A | 7/1989 | Jamieson et al. | |
| 4,873,651 A * | 10/1989 | Raviv | 700/259 |
| 4,914,293 A | 4/1990 | Hayashi et al. | |
| 4,935,728 A | 6/1990 | Kley | |
| 5,081,353 A | 1/1992 | Yamada et al. | |
| 5,126,574 A | 6/1992 | Gallagher | |
| 5,239,297 A | 8/1993 | Kley | |
| 5,377,552 A | 1/1995 | Kley | |
| 5,448,399 A | 9/1995 | Park et al. | |
| 5,751,683 A | 5/1998 | Kley | |
| 5,756,997 A | 5/1998 | Kley | |
| 5,808,977 A | 9/1998 | Koyanagi | |
| 5,912,934 A * | 6/1999 | Acks et al. | 376/248 |
| 6,028,305 A | 2/2000 | Minne et al. | |
| 6,108,077 A | 8/2000 | Heaton et al. | |
| 6,144,028 A | 11/2000 | Kley | |
| 6,194,711 B1 | 2/2001 | Tomita et al. | |
| 6,219,063 B1* | 4/2001 | Bouguet et al. | 345/426 |
| 6,229,138 B1 | 5/2001 | Kley | |
| 6,232,597 B1 | 5/2001 | Kley | |
| 6,242,734 B1 | 6/2001 | Kley | |
| 6,252,226 B1 | 6/2001 | Kley | |
| 6,265,711 B1 | 7/2001 | Kley | |
| 6,281,491 B1 | 8/2001 | Kley | |
| 6,337,479 B1 | 1/2002 | Kley | |
| 6,339,217 B1 | 1/2002 | Kley | |
| 6,349,113 B1* | 2/2002 | Mech et al. | 375/240.08 |
| 6,353,219 B1 | 3/2002 | Kley | |
| 6,369,379 B1 | 4/2002 | Kley | |
| 6,396,054 B1 | 5/2002 | Kley | |
| 6,507,533 B2 | 1/2003 | Sato | |
| 6,515,277 B1 | 2/2003 | Kley | |
| 6,611,617 B1* | 8/2003 | Crampton | 382/154 |
| 6,621,080 B2 | 9/2003 | Yamamoto | |
| 6,635,870 B1 | 10/2003 | Pachuta et al. | |
| 6,677,565 B1 | 1/2004 | Wahl et al. | |
| 7,027,642 B2* | 4/2006 | Rubbert et al. | 382/154 |
| 7,045,780 B2 | 5/2006 | Kley | |
| 7,106,898 B2* | 9/2006 | Bouguet et al. | 382/154 |
| 7,196,711 B2* | 3/2007 | Wang et al. | 345/584 |
| 7,340,944 B2* | 3/2008 | Beyder et al. | 73/105 |
| 7,417,213 B2* | 8/2008 | Krief et al. | 250/208.1 |
| 7,569,077 B2* | 8/2009 | Kollin | 850/19 |
| 7,588,605 B2* | 9/2009 | Ookubo | 850/11 |
| 7,617,719 B2* | 11/2009 | Su et al. | 73/105 |
| 7,631,547 B2* | 12/2009 | Yoshimatsu et al. | 73/105 |
| 7,690,047 B2* | 3/2010 | Yasuda et al. | 850/54 |
| 2002/0096633 A1* | 7/2002 | Gimzewski et al. | 250/306 |
| 2004/0046119 A1 | 3/2004 | Lutter | |
| 2009/0032706 A1* | 2/2009 | Prater et al. | 250/307 |

FOREIGN PATENT DOCUMENTS

| | | |
|---|---|---|
| EP | 1359593 A1 | 11/2003 |
| JP | 52008006 A | 5/1977 |
| JP | 01262403 A | 10/1989 |

OTHER PUBLICATIONS

CPO Ltd., Charged Particle Optics Programs—"The 'benchmark test' files," at URL reference www.electronoptics.com/ benchmar.htm.

Doll et al., "Low-energy electron beam focusing in self-organized porous alumina vacuum windows," *Applied Physics Letters* 76:24, pp. 3635-3637 (2000).

Munro's Electron Beam Software Ltd., SOURCE Graphics output for FE gun and for Pierce gun, URL references www.mebs.co.uk /fegun.htm and www.mebs.co.uk /pierce.htm.

Niell, "Electron Gun Beam Extraction with MOSFETs," Proc. 1999 Particle Accelerator Conference, New York, at URL reference accelconf.web.cern.ch/ AccelConf/ p99/ PAPERS/ MOP143.PDF.

Pierce, "My Work with Vacuum Tubes at Bell Laboratories," reprinted from SMEC (now SMECC) "Vintage Electrics," 3:1 (1991), at URL reference www.smecc.org/ john_r_pierce_electron_tubes.htm.

SRIM, "Historical Review", downloaded at http://www.srim.org/SRIM/History/HISTORY.htm on Nov. 29, 2006.

SRIM, "Particle Interactions with Matter", downloaded at srim.org on Nov. 29, 2006.

Tel Aviv University, "The Principle of Electrostatic Accelerator (EA) FEL Operation," at URL reference www.eng.tau.ac.il/ research/ FEL/ 0a.html.

Vaughan et al., "Synthesis of a hollow-beam pierce gun," IEEE Trans. Electron Devices, vol. ED-34, Feb. 1987 (Abstract), at URL reference adsabs.harvard.edu/ cgi-bin/ nph-bib_query?bibcode=1987ITED...34..468V& amp;db_key=INST.

V.P. Yakovlev et al., "100 MW electron gun for a 34.3 GHz magnicon," Proc. 2001 Particle Accelerator Conference, Chicago, at URL reference epaper.kek.jp/ p01/ PAPERS/ MPPH115.PDF.

Herndon et al., "Near-field scanning optical nanolithography using amorphous silicon photoresists," Applied Physics Letters. vol. 74, No. 1 (Jan. 4, 1999, pp. 1-3.

International Search Report PCT/US07/70357.

Communication pursuant to Rules 161 and 162 EPC of Jan. 30, 2009 for European patent application No. EP07875106, 2 pages.

Communication of European publication number and information on the application of Article 67(3) EPC of Feb. 18, 2009 for European patent application No. EP07875106, 1 page.

Supplementary European Search Report of Oct. 26, 2009 for European patent application No. EP07875106, 9 pages.

\* cited by examiner

30 Degree Trans with 60 degree entry angle and one reflection to 90 degrees
15% @ 10 nm
30% @ 20
46% @ 30
64% @ 40

Figure 11a

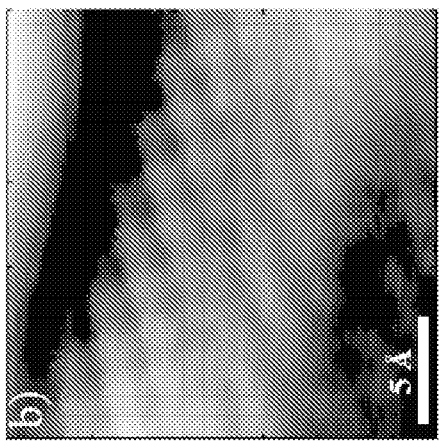

| | Carbon nanotubes | Boron nitride nanotubes |
|---|---|---|
| Electrical properties | Metallic or semiconducting | Always semiconducting [above 4 eV gap] |
| Mechanical properties [Young's modulus] | 1.33 TPa[31] | 1.18 TPa[12] |
| Thermal conductivity | More than 3000 W / m K[13] | High value expected Hexagonal boron nitride : 600 W / m K [in ab plane][14] |
| Chemical resistance | Stable up to 300 to 400 °C in air | Stable up to 800 °C in air[15] |

Relative Advantage over Si Columns

CNT > 20 times Thermal conductivity

BNT > 4 times Thermal conductivity secondary advantage
    high thermal stability of
    substrate aluminium – silicon – phosphorus C
Si
Ge 14P
14N Full table

| General | |
|---|---|
| Name, Symbol, Number | silicon, Si, 14 |
| Series | metalloid |
| Group, Period, Block | 14 (IVA), 3, p |
| Density, Hardness | 2330 kg/m³, 6.5 |
| Thermal conductivity | 148 W/(m*K) |

HIGH SPEED MEASUREMENT, ANALYSIS AND IMAGING SYSTEMS AND METHODS FOR LENGTH SCALES FROM METER TO SUB-NANOMETER

CROSS-REFERENCES TO RELATED APPLICATIONS

This application claims the benefit of the following U.S. Provisional Application: Application No. 60/803,804 filed Jun. 2, 2006, entitled "High-Speed Measurement, Analysis and Imaging Systems and Methods for Length Scales from Meter to Sub-Nanometer";

The present disclosure is related to the following co-pending U.S. Patent Applications and granted U.S. Patents directed to earlier inventions by the present inventor:

U.S. Pat. No. 4,561,731, issued Dec. 31, 1985;
U.S. Pat. No. 6,144,028, issued Nov. 7, 2000;
U.S. Pat. No. 6,229,138, issued May 8, 2001;
U.S. Pat. No. 6,242,734, issued Jun. 5, 2001;
U.S. Pat. No. 6,265,711, issued Jul. 24, 2001;
U.S. Pat. No. 6,281,491, issued Aug. 28, 2001;
U.S. Pat. No. 6,337,479, issued Jan. 8, 2002;
U.S. Pat. No. 6,339,217, issued Jan. 15, 2002;
U.S. Pat. No. 6,369,379, issued Apr. 9, 2002;
U.S. Pat. No. 6,232,597, issued May 15, 2001;
U.S. Pat. No. 6,396,054, issued May 28, 2002;
U.S. Pat. No. 6,515,277, issued Feb. 4, 2003;
U.S. Pat. No. 7,045,780, issued May 16, 2006;
application Ser. No. 11/531,248, filed Sep. 12, 2006, entitled "Tool Tips with Scanning Probe Microscopy and/or Atomic Force Microscopy Applications";
application Ser. No. 11/383,356, filed May 5, 2006, entitled "Micromachined Electron or Ion Beam Source and Secondary Pickup for Scanning Probe Microscopy or Object Modification";

The respective disclosures of these applications and patents including any attachments and/or appendices thereto are incorporated herein by reference for all purposes.

BACKGROUND OF THE INVENTION

The present invention is directed to techniques for measuring, analyzing, imaging objects and surfaces in a variety of sizes. More particularly, the invention provides a system and method for measuring, analyzing, imaging objects and surfaces from a macro size visible to the human eye to tens, hundreds or thousands of attometers or less then the width of a typical atom. In the most general terms, the invention relates to a device capable of measuring an object using a combination of low-resolution optical, high-resolution optical, SPM/AFM and/or material analysis techniques. The data gathered at various resolutions is correlated to absolute locations on the object's surface, allowing selected regions of the object's surface to be analyzed to any desired degree of precision (down to atomic scale). Such an instrument spanning as much as 17 orders of magnitude of measurement is termed and shall be called an attoscope; those incorporating the unique technologies described herein and elsewhere may be termed Åttoscope™ or Åscope™, trade mark terms of Åttoscopy, Inc. a Delaware corporation.

Existing attoscopes such as Transmission Electron Microscopes suffer from many problems that this invention seeks to overcome. Manufacturing and other processes pertaining to scanning probe microscopy, nanomachining, micromachining, machining, optics, biotechnology, and biomedicine may benefit from electron and/or ion beam imaging and modification but are not well served by speed, sample preparation, cost and destructive nature of present day electron beam, ion beam, and dual ion and electron beam systems. Especially in the biological world and increasingly in the semiconductor world high beam energies required for classical e-beam or ion beam systems are injurious or deadly to the subject, inspection requirements or production material under their influence.

From the above, it can be seen that an improved technique for the measurement, analysis, and imaging of objects in a variety of length scales is desired.

BRIEF SUMMARY OF THE INVENTION

Embodiments of the present invention address some or all of the above difficulties. Some embodiments may provide further advantages, including any or all of those listed herein.

It is desirable for embodiments of the present invention to transition seamlessly from the user's perspective from a low magnification (optical) to a very high magnification (using Scanning Probe Microscopy [SPM] and/or Electron Microscopy) by a simple process such as a zoom in or out control via software in a computer controlled display and to do so at or near the real time ($\frac{1}{30}^{th}$ of a second or faster) of the user.

It is yet another object of the present invention to operate in a natural or ambient environment and not require the sample to be prepared for vacuum environments which for biological samples can mean substantial changes to the sample or reduce the mortality of the sample.

It is additionally desirable for embodiments of the present invention to operate under water or other fluids.

It is a further object of embodiments of the present invention to provide for the determination of the material composition of the sample or any portion thereof down to a single molecule or atom of that material on the surface or in the interior volume.

Yet another aim of some embodiments of the present invention is to be able to operate in a high vibration factory floor environment at the prevailing temperature and under large variations of temperature over time.

It is still another object of embodiments of the present invention to integrate optical, SPM (including both near-field and far-field probe-delivered electromagnetic radiation) and electron methods each employed for that range or span of magnifications appropriate to its use but entirely transparent to the user.

It is a further object of embodiments of the present invention to provide a means for discriminating heights and the direction up or down of any surface for those low magnifications where classical optical methods predominate in this integrated system.

Yet another object of embodiments of the present invention is to provide a means for rotating the optic and SPM or e-beam head and/or the specimen through a range of angles such that sidewalls, undercuts, and crevices in the surface can be accessed by the optics and SPM/e-beam. This latter rotation also facilitates correction of a large surface area which may have a simple tilt on all or part of its surface such that when properly compensated the details in the tilted region are more accessible.

Another aim of embodiments of the present invention to provide new mathematical treatment in association with the respective views of the surface of a solid. Each surface view can be summed up into a representation of the overall solid object, the representation being fully rotatable and accessible as a 3D view or projected 3D view and/or series of 2D views on a suitable display device. The data or views can be then viewed subject to the broad range of matrix operations and well known techniques applicable to single-valued functions by the serial division of the multi-valued surface into single-valued functional representations.

It is yet another object of embodiments of the present invention to use Atomic Force Microscopy (AFM) guided nanomachining and other surface modification techniques to prepare sample objects or to prepare sample holders for use by other attoscopic techniques including TEM, SEM, atom probes, FEM, LEAP, FIM and other techniques well known in the art of attoscopy.

In a specific embodiment of the present invention, at low magnifications with large depths of field, a controlled source light provides precise direction and angle, polar state, color and intensity to cast shadows and differentiate reflectivity (albedo) which are discriminated in one frame or from frame to frame of the object image. These images are then differentially compared and used to determine the height, curvature, albedo and color of the object surface. A surface map of the object is produced and is used to set the simple optical, confocal and/or interference microscope optical focal range and additionally to determine start and stop points and as references in the algorithms that proceed. This may then be followed by an optical view at higher magnification (as directed by the user or an automatic sequence of measurement commands), which in turn images an SPM probe tip. At each consecutive in focus command the SPM tip is held by its z translation piezo a precise distance just above the focal plane of the objective in use. For example, the precise distance may be obtained by an automatic calibration process in which the tip is lowered into the focal plane by increasingly smaller amounts until it disappears from the image or by a test beam of modulated light that can be scattered from the tip and sampled from light collected by the objective. The SPM tip is then lifted out so that it is always kept just above the surface while in optical mode before it has approached and sensed the surface. The lowest point optically imaged below the region of the SPM tip represents the limit of travel for the optic assembly which carries the SPM tip. The region imaged below the SPM probe tip may be further examined by use of the SPM probe as the user demands higher and higher magnification until the limit of resolution of the SPM technique is reached, which today is less then an angstrom in x, y, and z dimensions for an appropriate probe. As the magnification is increased in the range of 20 to 40 nanometers square around a feature of interest, it may be appropriate to use an ebeam and/or electromagnetic source delivered from the SPM tip within a few nanometers of the surface as taught in referenced applications and patents.

In another specific embodiment of the present invention, a system for collecting measurement data regarding an object of interest is disclosed. The system includes a sample stage adapted to hold the object of interest. The system further includes an optical lens assembly disposed above the sample stage. The optical lens assembly is configured to capture an optical image of the object of interest. The system additionally includes a Scanning Probe Microscope (SPM) assembly having a probe tip. The SPM assembly is configured coaxially with the optical lens assembly. In addition, the system includes a positioning system configured to position the optical lens assembly and the SPM assembly with respect to the object of interest held on the sample stage. The probe tip of the SPM assembly is visible within the optical image obtained by the optical lens assembly.

In yet another specific embodiment of the present invention, a method of determining the position of an element of an object of interest is disclosed. The method includes positioning the object of interest upon a sample stage. The sample stage is adapted to hold the object of interest. The method also includes illuminating the object of interest with at least three illumination sources arranged at different angles with respect to the plane of the sample stage. Each illumination source creating a shadow of the object of interest. The method additionally includes characterizing at least one surface of the object of interest utilizing shadow information from the shadows of the object of interest to form a height maps of the object of interest. Furthermore, the method includes calculating the absolute position of the element with respect to a second element utilizing the height maps.

In yet another specific embodiment of the present invention, a system for collecting measurement data regarding an object of interest is provided. The system includes a sample stage adapted to hold the object of interest. The system also includes an optics assembly configured with a camera. The system additionally includes illumination sources arranged at different angles with respect to the plane of the sample stage. The illumination sources create shadows of the object of interest and each utilize a different wavelength. Furthermore, the system includes detectors configured to detect the shadows of the object of interest. At least one detector is receptive to each of the wavelengths used by the illumination sources. IN addition, the system includes a processing unit configured to calculate the height of the object of interest by utilizing input from the detectors. The processing unit is further configured to discriminate between upward and downward elements of the object of interest with respect to the camera imaging the object of interest.

In yet another specific embodiment of the present invention, a system for collecting measurement data regarding an object of interest is provided. The system includes a sample stage adapted to hold the object of interest. The system also includes an optical lens assembly disposed above the sample stage. The system additionally includes the optical lens assembly configured to capture an optical image of the object of interest. Furthermore, the system includes a Scanning Probe Microscope (SPM) assembly having a SPM probe tip. The SPM probe tip is formed of a suitable material for light reflection. In addition, the system includes a positioning system configured to position the optical lens assembly and the SPM assembly with respect to the object of interest held on the sample stage. The system also includes a modulated illumination source configured to reflect a light beam off the SPM probe tip through a relay mirror in one of the Fourier planes of the optical system. The system additionally includes a detector and amplifier assembly locked in step with the modulation of the light source The detector and amplifier assembly is further configured to determine if the SPM probe tip has entered the focus region of the optical lens assembly to create a reference for the SPM assembly in relation to the focal plane of the optical lens assembly.

In yet another specific embodiment of the present invention, a probe for use in an assembly to scan and/or interact with an object is provided. The probe includes a tip having a sharp end and an obdurate diamond coating formed at least at the sharp end. The tip is configured to use glancing angle reflection to reflect and guide a light beam generated by a light source to the surface of an object near the tip end.

In yet another specific embodiment of the present invention, a system for collecting measurement data regarding an object of interest is provided. The system includes a sample stage adapted to hold the object of interest. The system also includes an optical lens assembly disposed above the sample stage. The optical lens assembly is configured to capture an optical image of the object of interest; The system further includes one or more illumination sources. Furthermore, the system includes a Scanning Probe Microscope (SPM) assembly having a SPM probe tip. The SPM probe tip is formed of a suitable material for light reflection. In addition, the system includes a positioning system configured to position the optical lens assembly and the SPM assembly with respect to the object of interest held on the sample stage. The system also includes a detector assembly. The detector assembly is configured to receive light beams from the one or more illumination sources to image the surface of the object of interest near a tip end of the SPM probe tip.

A further understanding of the nature and advantages of the present invention may be realized by reference to the remaining portions of the specification and the drawings.

BRIEF DESCRIPTION OF THE DRAWINGS

FIGS. 11a and 11b are charts and diagrams describing and showing advantages of carbon nanotubes according to an embodiment of the present invention.

DESCRIPTION OF SPECIFIC EMBODIMENTS

Figure 1:
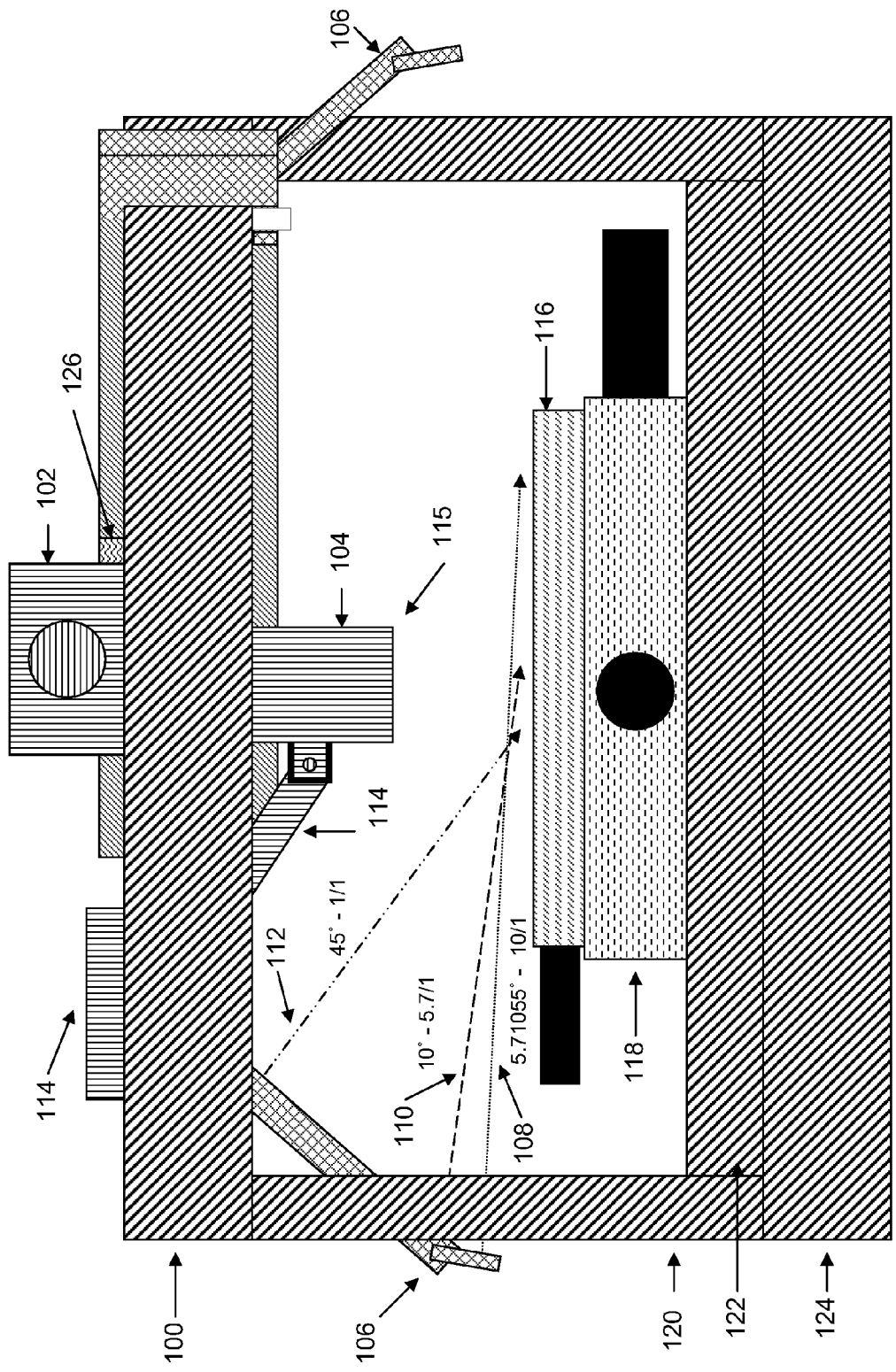
FIG. 1 is a side plan view of an exemplary attoscope incorporating an optic assembly and SPM module according to an embodiment of the present invention.

In an embodiment of an attoscope as shown in FIG. 1, a wide angle zoom lens assembly and camera 126 are mounted side by side with a higher resolution camera with confocal spinning disk and light source, objective lens with piezoelectric or other translation means operating on the lens and the SPM module (including x,y,z translation, cantilever motion detection means, and cantilever drive means) 104. The entire assembly may be rotated using a piezoelectric translation on a rotational flexure 114 or alternatively a very large bearing surface which is unclamped for movement and then clamped again for imaging and measurement. This assembly is called the imaging head 115. In an alternative embodiment, the sample holder may have a tilting mechanism (shown in FIG.

2b 202, 204) while the imaging head remains fixed, or both the head and sample may be tilted for optimum alignment.

The assembly is built on a clamped vibration-damped base 124, which, together with cross members 100, 120, 122 provides a rigid and thermally stable structure from which imaging head 115 and sample holders (not shown) are affixed. In an exemplary embodiment, the base and cross-members may be formed from granite or other suitable alternatives may also be used. For example, imaging head 115 may be securely attached to cross member 100 and moved using pivot 102; however, other alternatives for movement of imaging head 115 may also be utilized. An x,y 118 and/or theta 116 stage may be additionally provided for translational or rotational movement of the sample. The low resolution camera with zoom optics 126 looks down on the entire stage area which is illuminated by light provided by three or more collimated light sources 106. For example, light bars 108, 110, 112 from light sources 106 fully illuminate the stage and objects thereon from three or more angles with each respective bar and associated angle being capable of independently illuminating the entire stage. Each light bar 108, 110, 112 is associated with an specific angle and direction, and their accompanying light sources 106 may be spaced evenly around the objects at 120 degree intervals. Additionally, light sources 106 may each have different wavelengths of light (e.g., which are from 1.4 microns to 0.350 microns), a range readily available from high intensity LED sources. In a specific embodiment of the present invention, the three wavelengths utilized are red, green and blue wavelengths. The illumination beam angles for light bars 108, 110, 112 respectively between the beams and the top surface of the stage 116 may be 45, 10 and 5.71055 degrees in a specific embodiment of the present invention.

Figure 2:
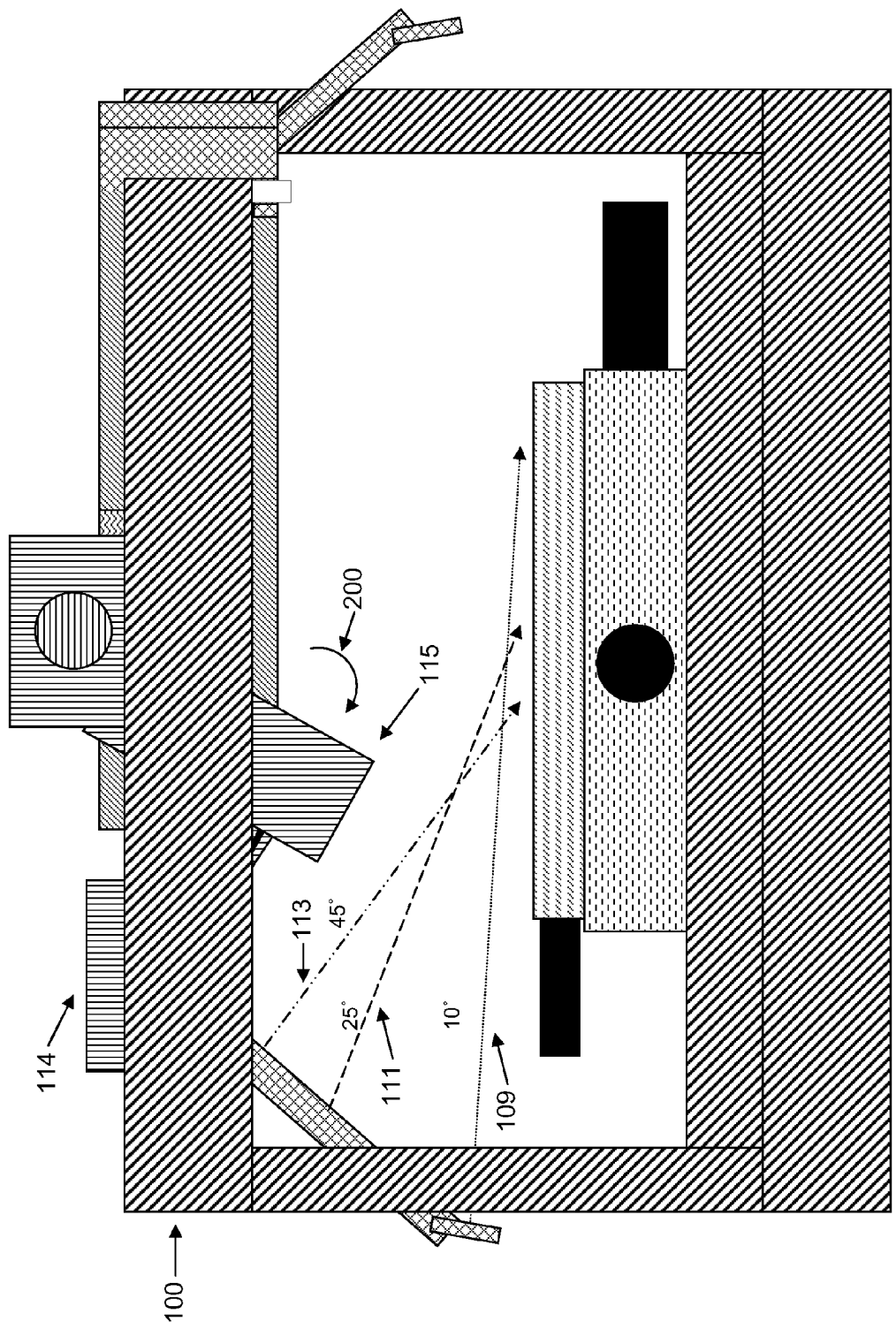
FIG. 2 is a side plan view of an exemplary attoscope incorporating an optic assembly and SPM module showing the imaging head being tilted according to an embodiment of the present invention.

FIG. 2 is a side plan view of an exemplary attoscope incorporating an optic assembly and SPM module showing the imaging head being tilted according to an embodiment of the present invention. For example, light bars 109, 111, and 113 in FIG. 2 may have different illumination beam angles of 10, 25, and 45 degrees according to a specific embodiment of the present invention. Imaging head 115 is tilted a degree of rotation 200 for optimum alignment with an object (not shown).

Figure 2A:
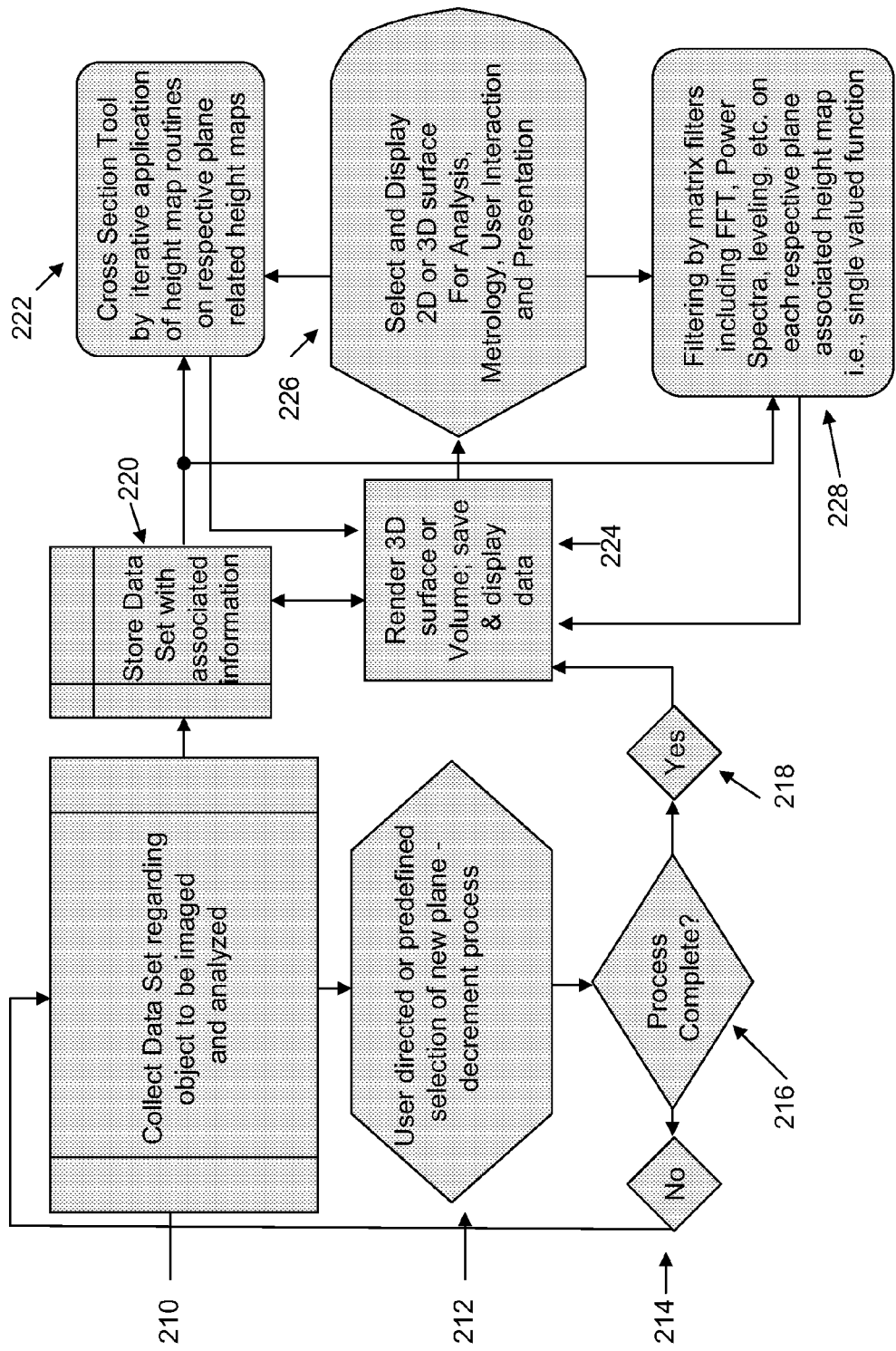
FIG. 2a is a simplified exemplary flowchart for operation of an exemplary attoscope according to an embodiment of the present invention.
Figure 2B:
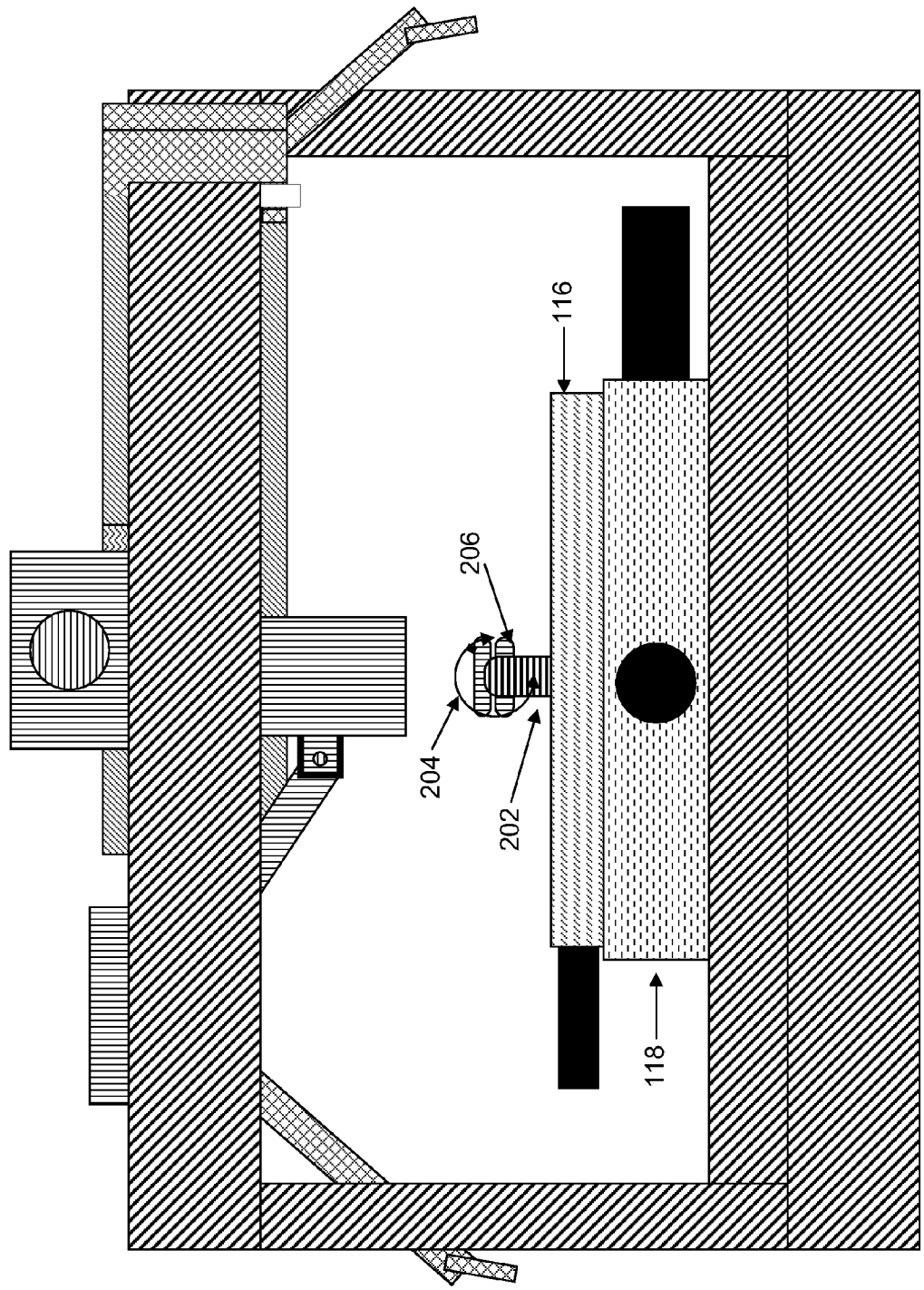
FIG. 2b is a side plan view of an exemplary attoscope incorporating an optic assembly and SPM module and a sample holder with a tilt mechanism according to an embodiment of the present invention.

FIG. 2a is a simplified exemplary flowchart for operation of an exemplary attoscope according to an embodiment of the present invention. In step 210, a variety of data is collected regarding an object to form a data set which may be used to form a surface view or height maps of the object. For example, the data obtained in step 210 may consist of variable-resolution and other characteristic information including, but not limited to spectrographic, mass spectrographic, magnetic, electric, friction, viscosity, conductivity, and other measurements well known in the art for each and every point in the data set obtained. The data may be immediately stored with associated information in step 220. For example, the data set can be one height map or volumetric map from a given facet of the polygonoid enclosing the object(s) such as is shown as a 7 sided polygonoid 209 (FIG. 2c) enclosing object 206 (FIG. 2b). Additional information may be indexed in step 220 in order to characterize the volume and/or tile the surface from a given direction, which may be normal to the facet of the polygonoid. In step 212, the user or a predefined process may direct the collection of additional data sets to be stored (e.g., using a different direction or plane); such direction may include decrementing a process counter. Step 216 determines whether or not the data collection operation for the object is complete. If the operation is not complete (step 214) as determined by the user or the predefined process, step 210 may be repeated to continue data collection of the object. As the data collection process proceeds, scans of large or small areas at any prescribed point wise and scan line wise resolution are subsequently embedded in the surface data set which describes the entire imaged surface. Adjacent or non-adjacent regions may also be imaged (e.g., by optical, SPM, electron beam or near field optical means). Data for each region is then added to the overall scan data collected in this process.

To collect optical and SPM data, the operator or automated routine may position object 400 (shown in FIG. 4) underneath the SPM module 104 and an optical section or series of optical sections may be collected to form a surface view or height map of object 400. The operator or automated routine may then increase the magnification such that the SPM probe 600 (shown in FIG. 6) and its long shaft tip 603 (shown in FIG. 6) are brought into action and a scan of the region of the object 400 is initiated. Information from this and subsequent scans are then incorporated by the computing system into the surface data set and displayed at the magnification called for by the operator or automatic process (see FIG. 2a). The head may also incorporate special SPM capabilities (e.g., as described in the above-referenced patents and applications) including electron beam scans, and near field optical scans using electromagnetic radiation generated by mechanisms in the SPM tip assembly or brought in to surfaces on the tip assembly as shown in FIGS. 7, 7a-e.

Referring again to FIG. 2a, after a data set has been stored, a cross-section tool may be used in step 222 on an individual height map or portion thereof (or an interpolated height map) and summed together to obtain an overall effect across the entire surface. Alternatively, a surface measuring, shape embedding, or cursor embedding technique may also be used. An iterative application of height map routines on respective plane-related height maps may be performed. After data collection is complete, a 3D surface or volume may be rendered in step 224, and the data can be saved and.or displayed. In step 226, a 2D or 3D surface may be selected and displayed for further analysis, metrology, user interaction, and/or presentation. In step 228, filtering by matrix filters (including Fourier transform, power spectra, leveling, or other fillers) may be performed on each respective plane-associated height map or single-valued function. Thus, the height maps may be used to tile all or part of a real object surface, and any Fourier transform, power spectrum, roughness measure, wavelet or similar technique for manipulating, filtering and sorting data from the spatial domain to the frequency domain and their inverses may be used on an individual height map or portion thereof (including an interpolated height map). Results from individual height maps may be summed together to obtain the characteristics of the entire surface including interior elements.

FIG. 2b is a side plan view of an exemplary attoscope incorporating an optic assembly and SPM module (e.g., similar to FIG. 1) and a sample holder with a tilt mechanism according to an embodiment of the present invention. For example, tilting mechanism 202, 204 may be used to manipulate object 206. In addition, as described above, where the data set is one height map or volumetric map from a given angle (or facet) of the polygonoid enclosing the object(s)—such as is shown as a 7 sided polygonoid in 209 (FIG. 2c) enclosing object 206 (FIG. 2b)—such additional information may be indexed in step 220 (FIG. 2a) in order to characterize the volume and/or tile the surface from a given direction, which may be normal to the facet of the polygonoid.

Figure 2C:
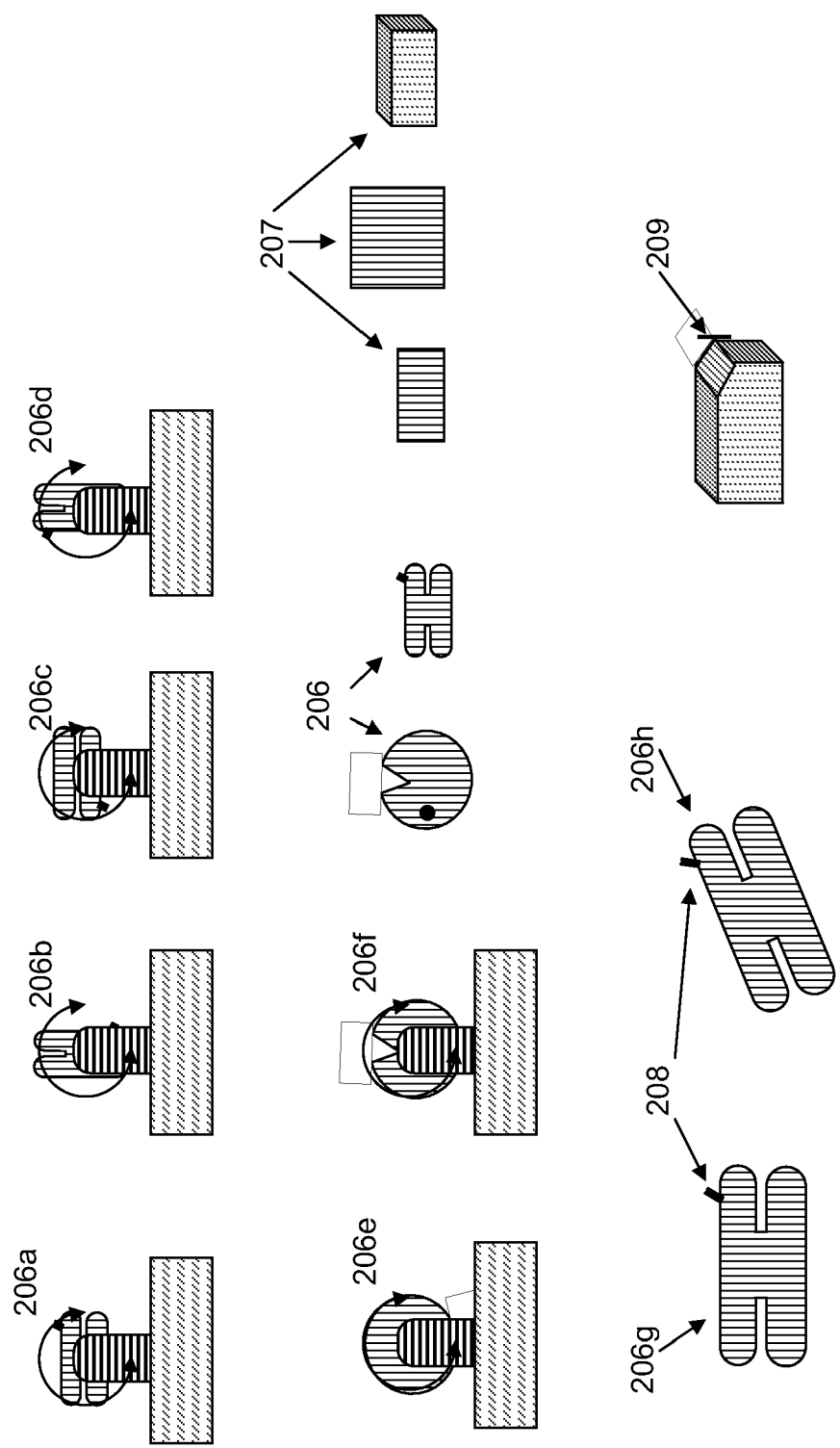
FIG. 2c is a side and perspective view of objects used to characterize the volume and/or tile the surface from a given direction of a target object according to an embodiment of the present invention.

FIG. 2c is a side and perspective view of objects used to characterize the volume and/or tile the surface from a given direction of a target object according to an embodiment of the present invention. For example, rotational diagrams 206a-206h show the rotational movement of enclosing objects 206 used to analyze and determine data sets associated with the object.

Figure 2D:
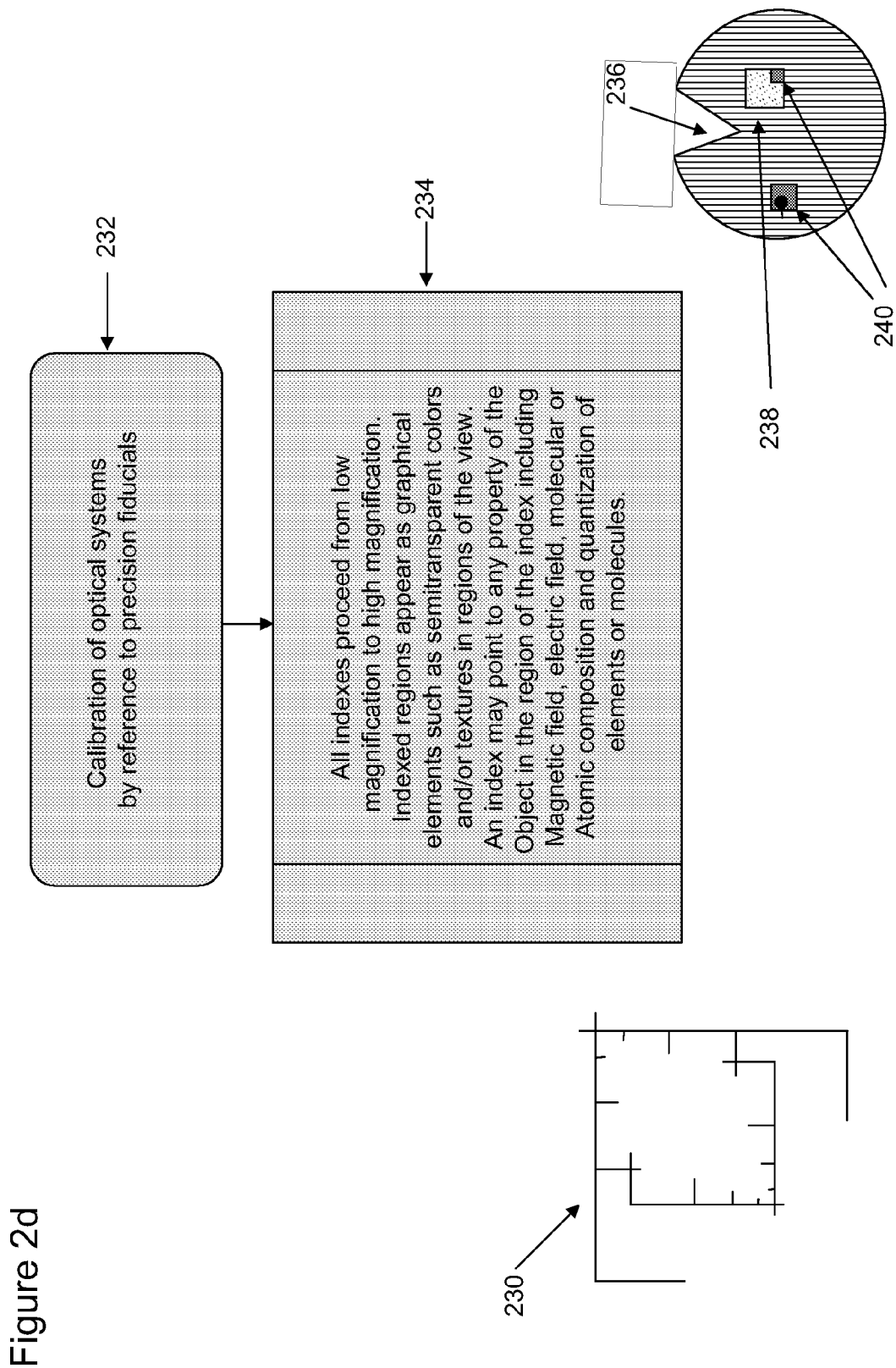
FIG. 2d is a simplified flowchart and diagram of objects and processes used in integrating, indexing, and referencing object data according to an embodiment of the current invention.

FIG. 2d is a simplified flowchart and diagram of objects and processes used in integrating, indexing, and referencing object data according to an embodiment of the current invention. For example, certain subtasks may need to be performed before step 210 (FIG. 2a) may be used to begin data collection. In step 232, nested fiducials 230 are used in an automated routine to calibrate each zoom level of the optical system to correct for scale, rotation and offset between optical views. This ensures that all optical views can be accurately and repeatably related and indexed from the lowest zoom level used in any given series of qualitative and/or quantitative measures. In step 234, indexes may proceed from low magnification to high magnification. For example, indexed regions may appear as graphical elements such as semitransparent colors and/or textures in regions of the view. An index may point to any property of the object in the region of the index including magnetic fields, electric fields, molecular or atomic composition, and quantization of elements or molecules.

In some embodiments, a data set is embedded and variable in resolution with higher resolution elements being referenced to coarser but larger-range elements as represented in FIG. 2d by images 236, 238 and 240. Image 236 is an optical overview of the entire object at low magnification. Within image 236 another higher optical resolution image 238 may be obtained which links to points in 236. In turn, an even higher magnification image 240 may be obtained by the SPM and referenced to the high resolution optical image 238 and to the low resolution optical image 236. These higher resolution, higher magnification objects may appear as graphically highlighted on the display device 226 when the data has been zoomed out from the highest magnification view and the new view encompasses the previously obtained high resolution data subsets.

For example, a low-power overview zoomed image of the entire object 206 that just fits in a frame 2 cm on a side can be merged into a camera image of 1000×1000 points with z characteristics derived from the structure of light shadows as described in my earlier U.S. Pat. No. 7,109,482. This constitutes a height map view of the object 206 normal to one face of an enclosing polygonoid 209. This object may thus be divided into approximately 1,000,000 points roughly 20 microns apart. In a specific area of this surface centered on a point (x,y); the high power confocal system then makes a series of optical sections over a 100 micron area at 1000×1000 points (100 nanometer spacing) bounded by the previously determined upper and lower limits of the low power image from which a surface and/or volume with bounding surfaces is obtained. This information is then stored and indexed to the coarse image data points x and y. Within the last surface or volume image a region with central optical point (x',y') is then scanned over a range of 500×500 nanometers (five resolution points of the last high power optical scan) by an SPM affixed and coaxial with the objective of the high power optical system, again with a resolution of 1000×1000 points and saved as indexed to the points x' and y'. The resolution of this step is then 5 Ångstroms. Within this resolution points (x",y") are centered at which an e-beam probe as described in the related patents and applications with a spot size of 1 nanometer is scanned over a range of 5×5 nanometers at 50×50 points with a resolution of 1 Ångstrom. This region may then be rescanned by the same e-beam in which the beam energy has been increased such that the beam is accompanied by a free electron laser beam. As the beam is scanned, this causes atoms under the beam be energetically dislodged and pulled away into a FAT spectrometer, and/or mass spectrometer, and/or spectrograph, and/or atomic absorption spectrometer, and/or liquid chromatograph, and/or polymerase chain reaction (PCR) and genetic replication and/or other measurement system known in the art for molecular or atomic determination. These systems can identify each atom, molecule or volume of material in its constituent parts and each such identification is associated with a particular position on the sample. This process may be used again and again to build up an atomic image of the surface and layer by layer regions below the surface to the limit of the SPM probe and beam characteristics. All of the latter elements may be linked together in one data set which may be accessed by the user or automated routine to range throughout the various data sets so linked. The latter process may be repeated over the same coarse view or on alternative views as often as desired to build up any complexity of image. Alternatively, a suitably intense electromagnetic beam such as beam 708 in FIG. 7a reflected from the back 702b of three sided tip structure 702 and/or the small beam 700 reflected from the narrow front 702c of tip structure 702 may be used in conjunction with the e-beam and/or light beam to displace a larger region of material from the surface of the object. The tip itself, as described in the above-referenced applications, may be used to excavate or dig material from the surface in quantities and volumes appropriate to its depth in the surface material and its shape in the directions of cutting or excavating material.

Figure 3:
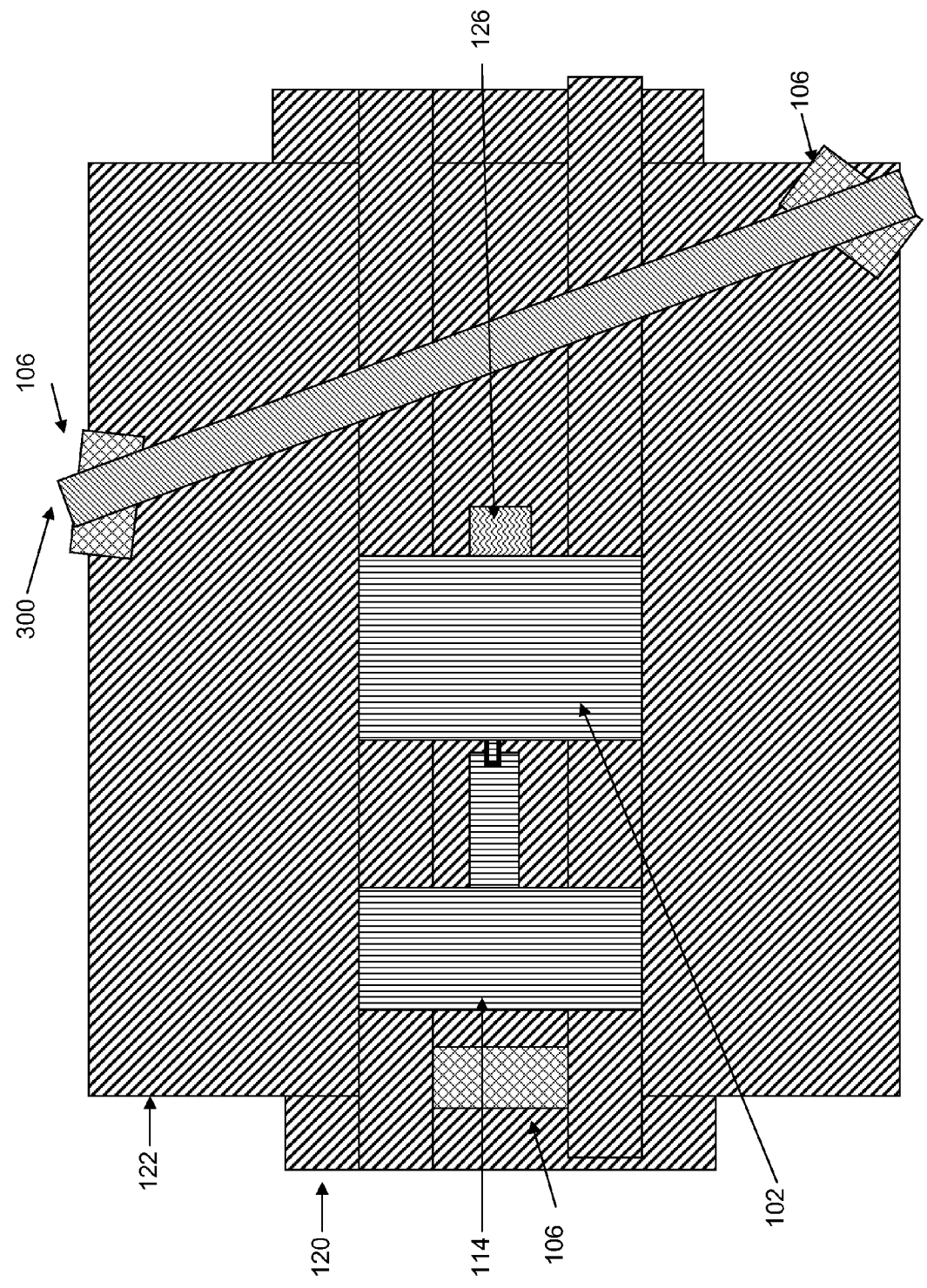
FIG. 3 is a top plan view of an exemplary attoscope showing a rotational flexure and multiple light sources according to an embodiment of the present invention.

FIG. 3 is a top plan view of an exemplary attoscope (e.g., the attoscope shown in side view in FIG. 1) showing the rotational flexure and multiple light sources according to an embodiment of the present invention. For example, three light sources 106 are shown arranged around the periphery of the attoscope in roughly 120 degree intervals to illuminate an object (not shown). Two of the light sources 106 may be attached to support beam 300 which allows for secure orientation and placement of the light sources.

Figure 4:
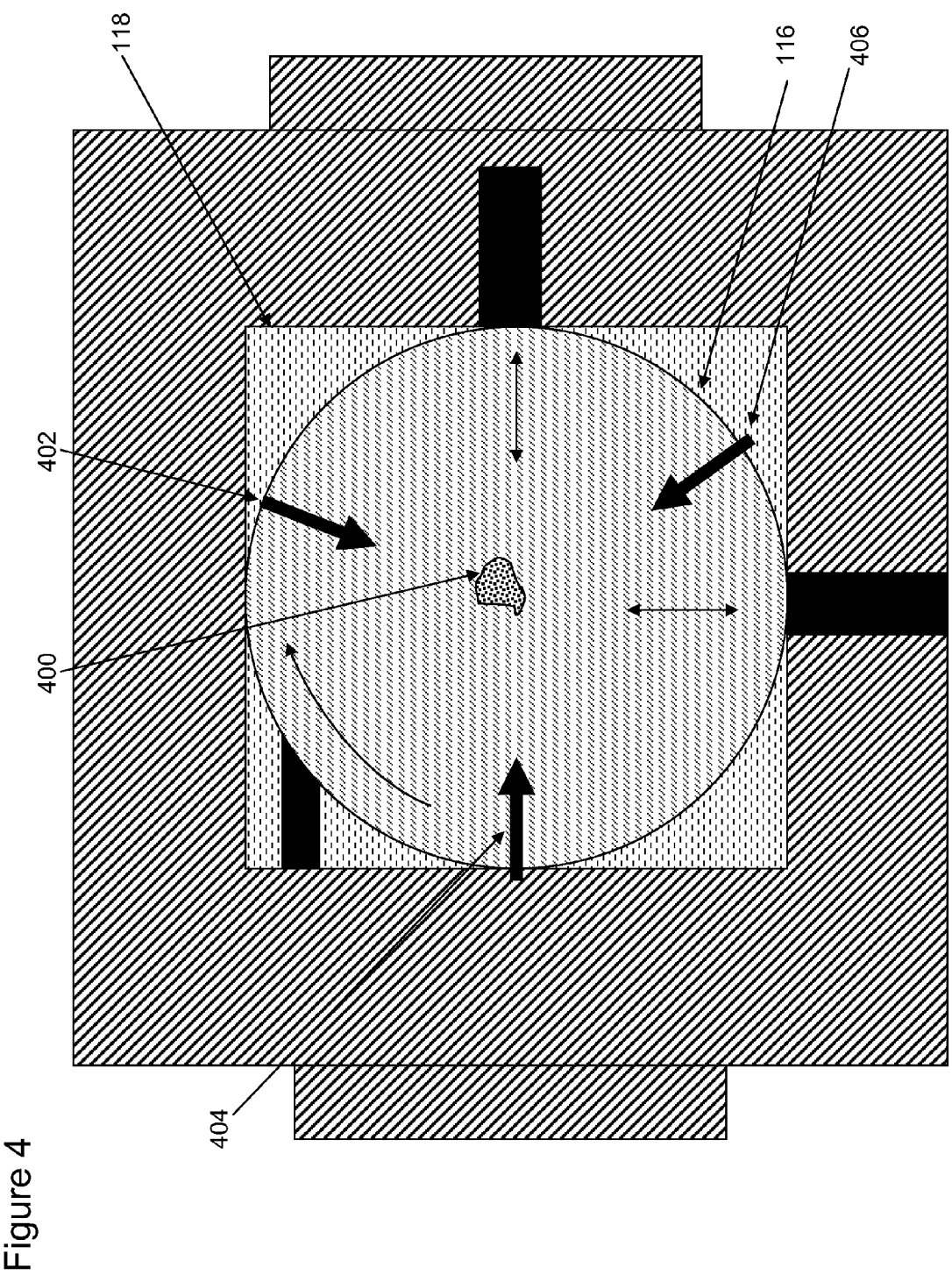
FIG. 4 is a top cross-sectional view of an exemplary attoscope showing multiple light sources illuminating an object to characterize the height and form of the object according to an embodiment of the present invention.
Figure 4A:
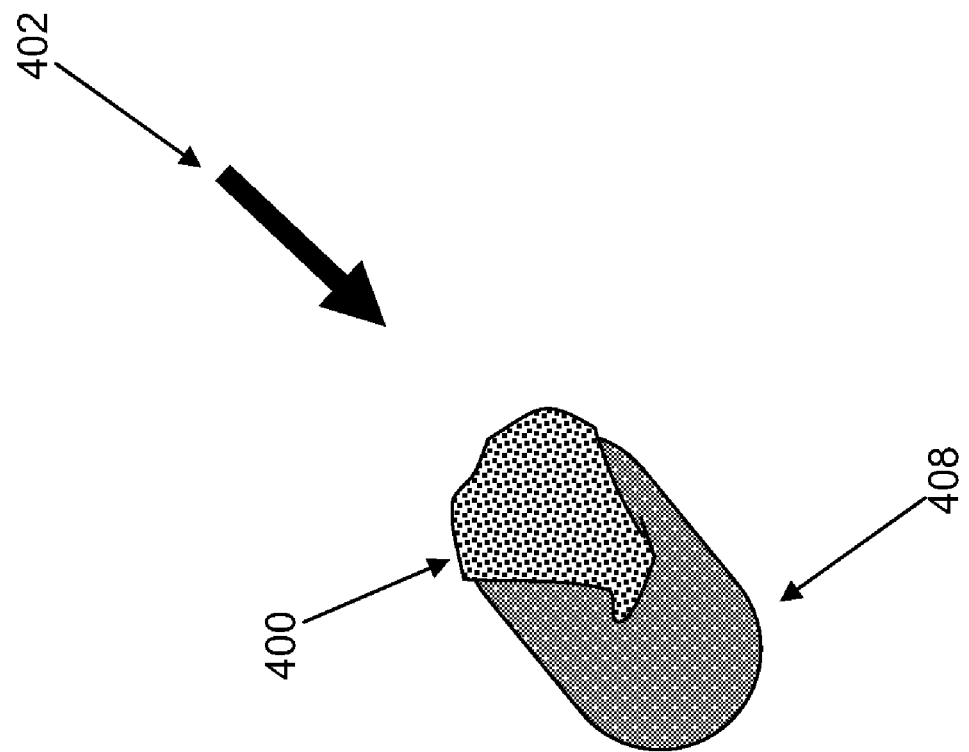
FIG. 4a is a top view of a light beam with a red wavelength casting a shadow of an object according to an embodiment of the present invention.
Figure 4B:
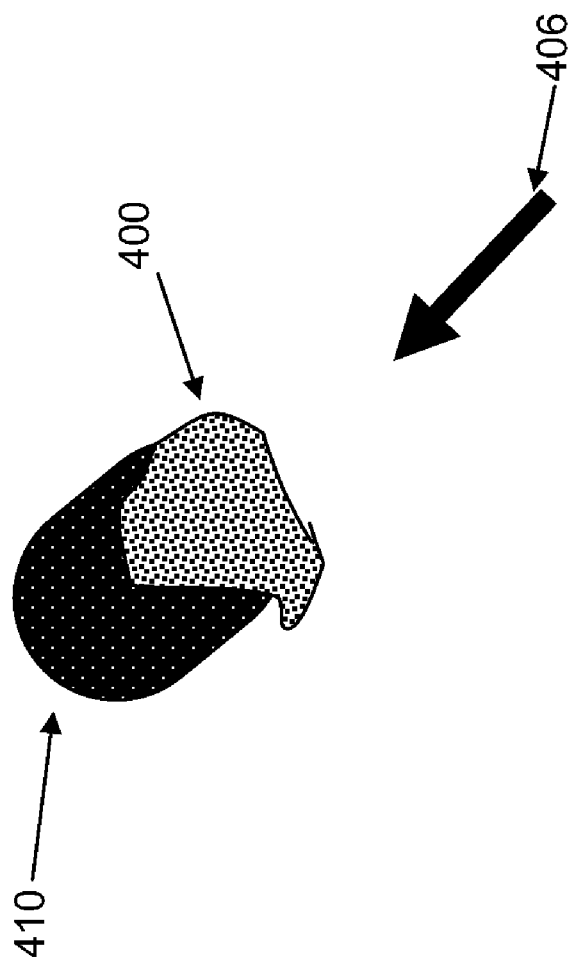
FIG. 4b is a top view of a light beam with a blue wavelength casting a shadow of an object according to an embodiment of the present invention.
Figure 4C:
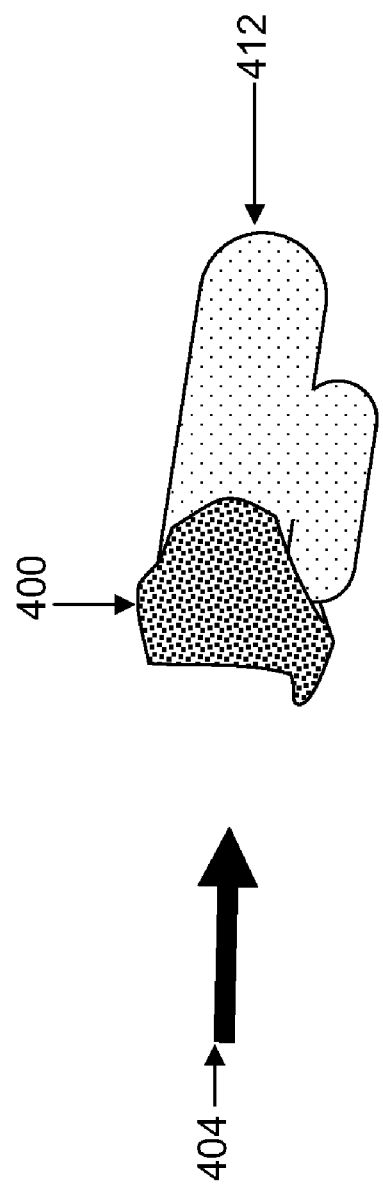
FIG. 4c is a top view of a light beam with a green wavelength casting a shadow of an object according to an embodiment of the present invention.

FIG. 4 is a top cross-sectional view of an exemplary attoscope showing multiple light sources illuminating an object to characterize the height and form of the object according to an embodiment of the present invention. The respective light bars/beams 402, 404, 406 cast shadows that have respective length ratios of 10/1, 5.7/1 and 1/1 with respect to vertical structures on object 400 on the stage. Thus when the object on the stage is illuminated by one set of beams at a given angle but with different wavelengths (e.g., red 402, green 404 and blue 406), it casts respective shadows 408, 410, and 412 as shown in FIGS. 4a-4c in three directions on the stage. As detailed in the related patents and applications, this information can then be used to characterize the height and form of object 400 in the z direction. Furthermore, the use of beams at included angles less than 45 degrees such as beam 108 (see FIG. 1) provide a magnification of the height of the respective structure by many times, permitting a low resolution system to resolve small vertical features well beyond its inherent simple optical limit. Additionally, the use of three different wavelengths (e.g., red, green and blue) permits common color cameras to capture in one frame shadow information from three directions which previously would have required three frames to capture and which would have some uncertainty of alignment and variability that is essentially eliminated by embodiments of the present invention. This process may proceed over multiple frames at different angles to more fully characterize the overall surface of object 400. A full characterization may provide a guide to the system software in setting the range and limits in z for any given area of object 400 and for any potential physical interference by contact with higher resolution head 104.

Figure 5:
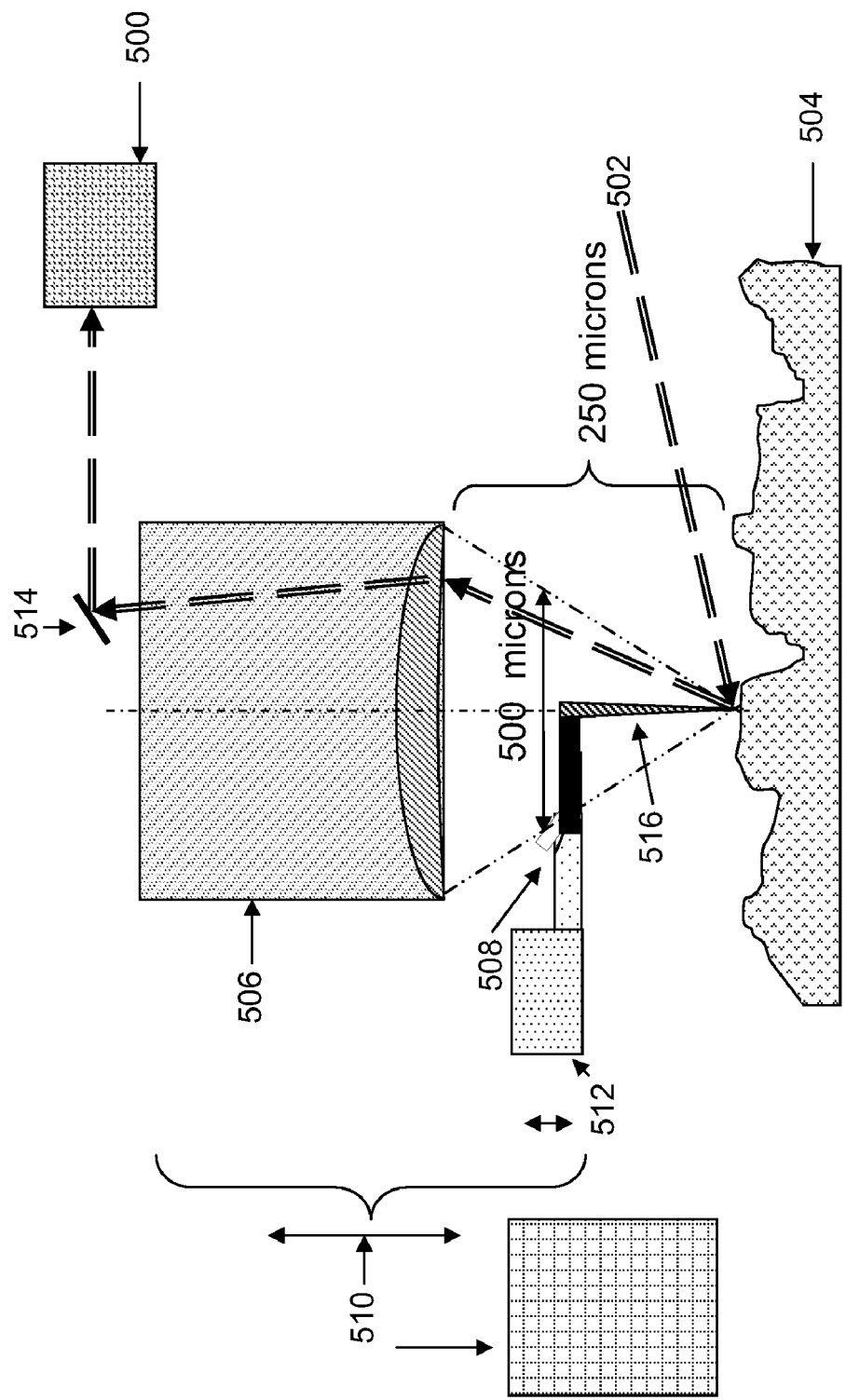
FIG. 5 is a side plan view of a z axis precision measurement system of an attoscope according to an embodiment of the present invention.
Figure 5A:
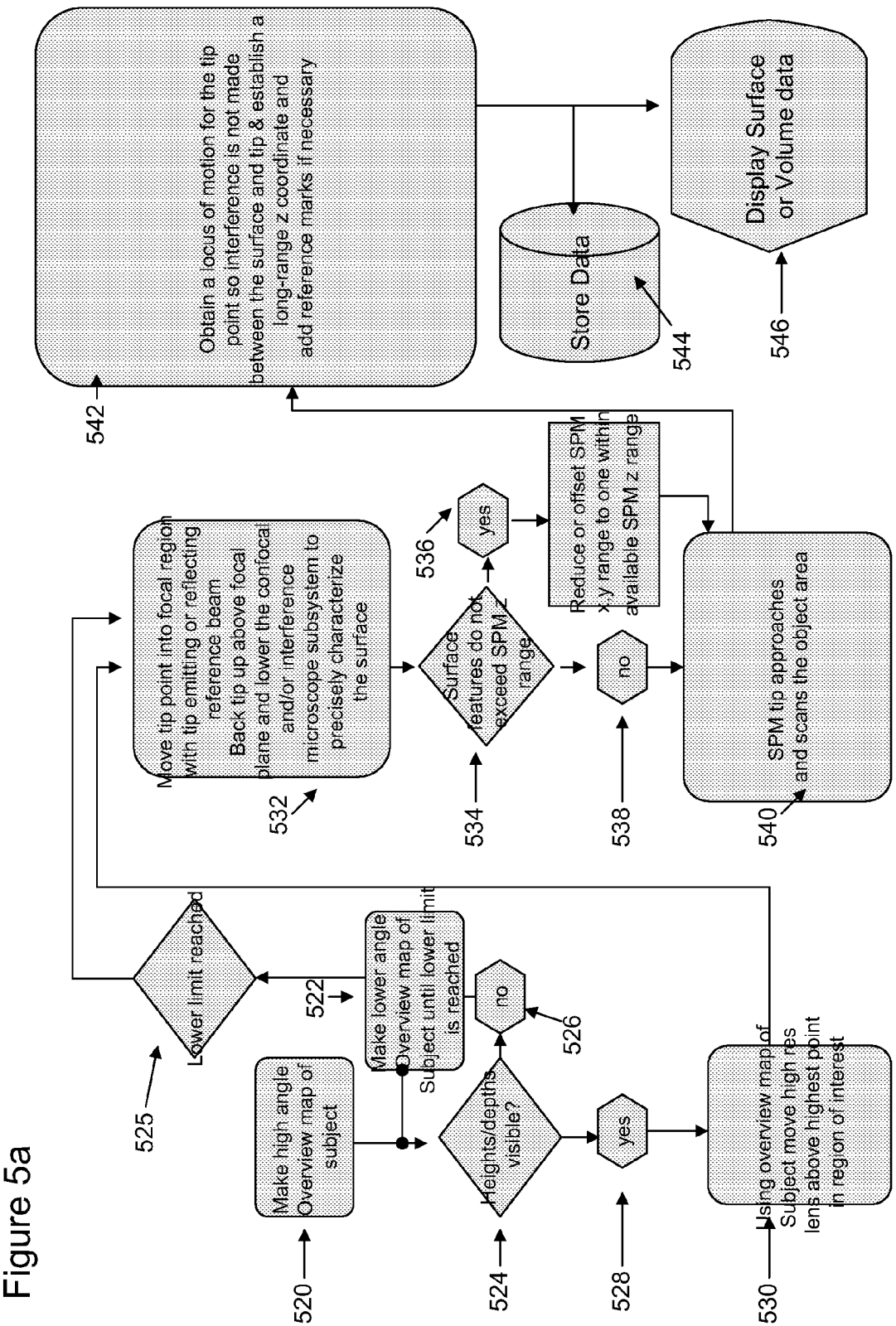
FIG. 5a is a simplified exemplary flowchart for computerized operation of the z axis precision measurement system shown in FIG. 5 according to an embodiment of the present invention.

A preferred embodiment of the z axis precision measurement system is shown in FIG. 5 while a flow chart of computer control of its operation is shown in FIG. 5a. An SPM such as an AFM 512 is attached rigidly to z translation and measurement structure 510, as is confocal microscope 506 and an object 504 to be imaged. The AFM tip shaft 516 and cantilever 508 can be translated in z by the AFM z translation structure 510 (e.g., a piezo electric element as is known in the art) vertically with respect to confocal microscope 506 and object 504. The length of tip shaft 516 of cantilever 508 is sufficiently long (in relation to the numerical aperture of the objective lens in confocal microscope 506) to permit the tip to be imaged by confocal microscope 506. In addition, z translation subsystem 510 is calibrated to precisely measure any translation of the confocal/AFM assembly in the z direction. In operation, the shallow focus or depth of field of confocal microscope 506 is advantageously referenced to AFM tip 516. Once this has been performed, z translation subsystem 510 can then locate any other z position that is in focus in the confocal microscope subsystem 506, and this z level may be accurately probed by the fine z position system of the AFM 512. In one embodiment, the AFM tip 516 (normally kept above the focal plane of the lens) is brought down into the focus region until light beam 502, which is modulated in conjunction with lock-in amplifier and detector assembly 500, is just detected as it appears in the pickoff mirror 514 in or near a translated back focal plane behind the nipkow [??] disk (not shown). This detection is limited only by the speed of the detector assembly 500 and is not related to the focusing mechanism of confocal subsystem 506. In an alternative embodiment of the present invention, the tip may be detected when it just appears in a focused frame by lowering it into the focus region and checking the frame for its appearance. In this embodiment, no separate light source or detection system is required. The control system, which works from the coarse overview map of the surface first obtained by the low power lens, should additionally prevent the z translation system 510 from lowering the confocal/AFM system such that tip 516 is brought into contact with the surface of object 504. This may be obtained by keeping the AFM tip 516 at the upper end of its AFM-controlled z travel and not overshooting the coarse limits and automatic optical focus of the confocal system. Alternatively, the tip may emit light as taught in the above-referenced patents and applications.

FIG. 5a is a simplified exemplary flowchart for computerized operation of the z axis precision measurement system shown in FIG. 5 according to an embodiment of the present invention. In step 520, an overview height map of the object is first created at a high-angle overview. If heights and depths are visible in step 524, a high resolution lens is moved above the highest point in the region of interest using an overview map of the subject (step 530). Alternatively, if heights and depths are not visible (step 526), a lower angle additional overview map of the object is made (step 522) and combined with the existing overview of the area in a recursive manner until either the heights and depths are visible or the angle cannot be further lowered (step 525), meaning that the height/depth range is less than the lower range of the SPM and the overview of the surface is flat. In step 532, the tip is moved into the focal region with the tip emitting or reflecting a reference beam to find the focal optic plane with the SPM tip by calibrating to a z-axis. The tip is then moved above the focal plane and the confocal and/or interference microscope subsystem is lowered more to precisely characterize the surface. In step 534, an optical high resolution map is checked to confirm that the surface features do not exceed the z range of the SPM (step 534). If so (step 536), the SPM (x, y) range is reduced or offset to a range within the available z range. In step 540, the SPM tip approaches and scans the area as necessary in response to operator instructions or an automated measure sequence. In step 542 the high-resolution optical overview maps may be used to avoid interference between the surface and the tip. For example, if moves are requested on the surface, the stage and z-axis may be moved to obtain a locus (or path) of motion for the point of tip that does not pass through the surface (allowing an offset or error margin). At the completion of move, if the user or measurement routine requests it, an approach and SPM measurement or other more detailed confocal, interference, or other optical measure may be performed. The Z-stage position may be used to absolutely reference the confocal and/or interference and/or simple optical plane to the probe tip to establish a long range z coordinate. The x, y, and z axis data may be stitched together to extend the probe tip range in areas where coarse embedded references have insufficient accuracy. Where very high accuracy and resolution are necessary and only SPM or e-beam measurements are adequate and no regular features can serve as absolute references, marked stitching may be performed. In "marked stitching," the tip removes or adds a reference mark or marks, moves the stage and/or z axis and scans to capture the mark, allowing the scans to be precisely linked. For example, the tip may be displaced along the intended vector defining the measurement capturing the last SPM or e-beam scan with the next to stitch the data points together using the mark as an absolute reference. This process may be repeated as necessary to cover the required range. The results may be saved in step 544 and/or displayed in step 546 as surface or volume data or variable data set results.

Figure 6:
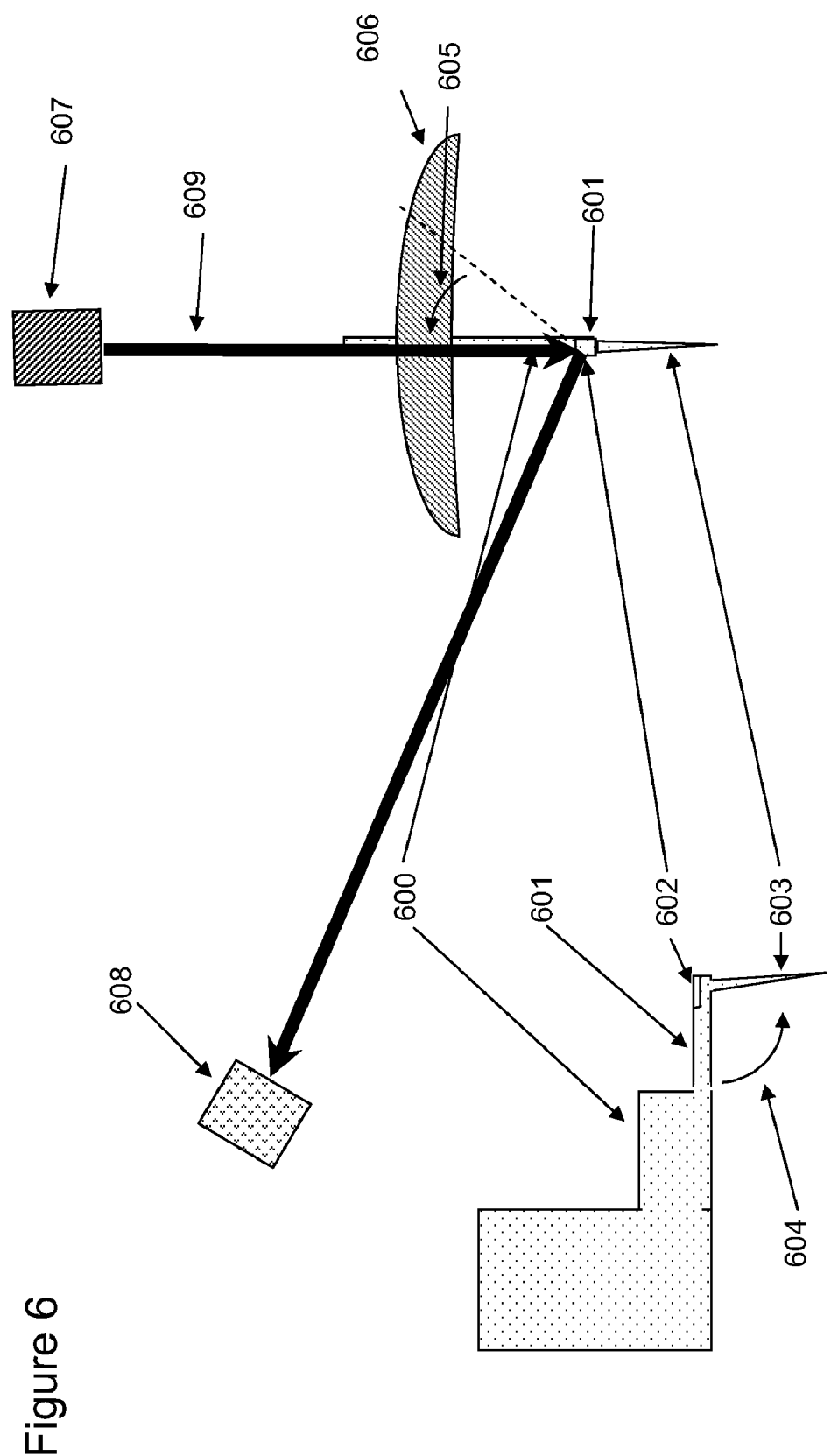
FIG. 6 is a side plan view, end view with objective optical lens and top view of the thin cantilever and tip construction showing a mirror cantilever reflector with laser light emitter and detector according to an embodiment of the present invention.

FIG. 6 is a combined side plan view, end view with objective optical lens and top view of the thin cantilever and tip construction showing a mirror cantilever reflector with laser light emitter and detector according to an embodiment of the present invention. As shown in FIG. 6 the tip 603 has a shape which gets narrower at the end furthest away from the cantilever 601, a length almost equal to the length of the cantilever, and a precise angle 604 with respect to the cantilever to meet any particular design goal. Further, the angled reflecting surface 602 may be formed by the angled recess made by a self-limiting wet etch by KOH of silicon (not shown). Off-axis single crystal silicon can produce different angles of this surface, and as is well known in art, the surface can be atomically smooth in crystalline material with few or no dislocations or faults. The formation of the entire cantilever and tip by using the planar surface of the bulk structure (silicon wafer, diamond wafer, sapphire wafer) is a substantial departure from the present method for cantilever and tip manufacture and can lead to improved and/or additional functionality for the cantilever and tip assembly or can lead to an ability to make the tip rigid as the end of a pinned beam rather then a cantilever. Thus, the cantilever and tip can function unclamped as any of the common SPM techniques requiring a cantilever beam or, after being clamped, the tip can function as a true STM or mode of SPM in which the tip must be extremely rigid.

In operation as shown in FIG. 6, the tip design 603 is combined with a portion of the components of a typical SPM or AFM system including optical objective 606, laser source 607 and light beam 609 reflecting off of angled reflecting surface 602 etched at angle 605. The thin body 600 subtends the minimum amount of the microscope objective's 606 cone of acceptance while supporting the cantilever, while the angled reflector offers a way to put the optics, laser and detector somewhere outside the plane of body, cantilever and tip support, and near the translation structures (not shown but well known in the art). Furthermore the angled reflector may also reveal surface interactions in a direction perpendicular to the cantilever in the plane of the surface to be scanned by the SPM as seen in FIG. 4C. The beam of light 609 emitted by laser and optic assembly 607 is reflected off 602 and into the detector assembly 608. Detector 608 may consist of two sensors (not shown) and a beam splitter (not shown) so that the Z and X components of the beam spot motion may be separated, with one sensor seeing only beam excursions in the vertical direction, and the other sensor seeing only X excursions. Alternatively, a single sensor with no beam splitter may be used to see the respective motions of the cantilever end. In another embodiment of detector assembly 608, a square or rectangular array detector (not shown) may be used to detect both types of excursions simultaneously. Thus the angled reflector permits an unambiguous method for detecting SPM interactions (such as AFM—atomic force, MFM—magnetic force, CFM—chemical force, and other cantilever motion techniques well known in the art) in two axes.

Figure 6A:
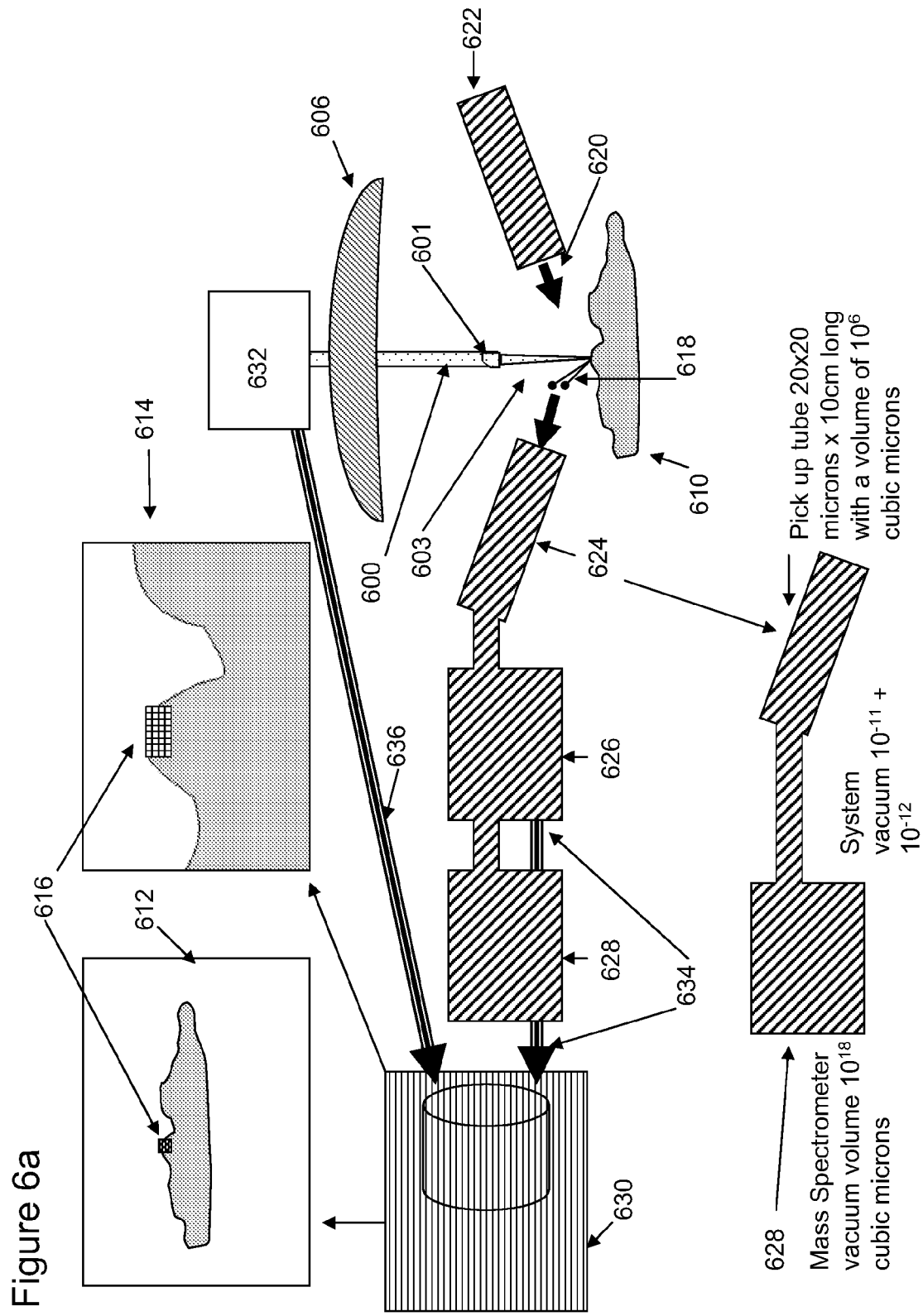
FIG. 6a is a side plan view of an attoscope assembly with data collection, analysis, and display capabilities used to build up a detailed representation of an object according to an embodiment of the present invention.

FIG. 6a is a side plan view of an attoscope assembly with data collection, analysis, and display capabilities used to build up a detailed representation of an object according to an embodiment of the present invention. A construction as described previously is shown in FIG. 6a in which an object 610 undergoes a surface data collection using confocal optics 606 and camera 632, along with AFM probe 600 with long tip shaft 603 to produce confocal and AFM linked surface data. This data is transported to control system 630 and display 612 (a zoomed version of the data set is shown as 614). After finding a region of interest on object 610, the AFM tip 603 is used to sequentially cut free small volumes 618 at the surface of 610. Volumes 618 are transported by gas and/or liquid 620 from supply 622 to pickup 624 and are drawn first into spectrograph 626 (which determines the molecular constituents) and then into mass spectrograph 628 (which determines the atomic constituents of each volume of material). This information for region 616 can be transmitted over communications channel 634 to control system 630, which links each such information to physical location on the object 610 and displays a detailed representation of volume/sample 616 in its proper and precise location on object 610.

Figure 6B:
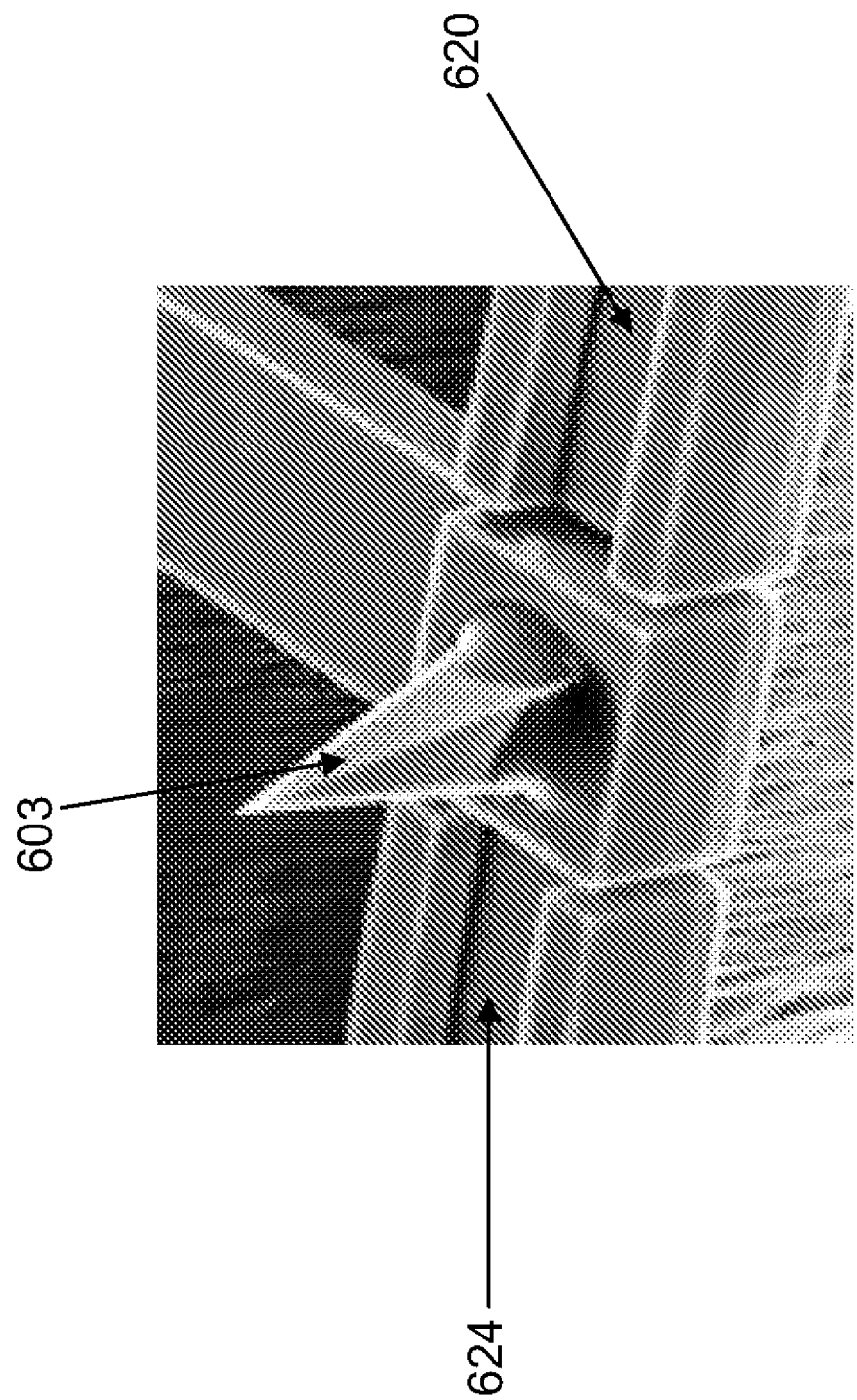
FIG. 6b is an exemplary image of a sampling pickup and shaft tip which can be used at atmospheric pressure in conjunction with vacuum components according to an embodiment of the present invention.

FIG. 6b is an exemplary image of a sampling pickup and shaft tip which can be used at atmospheric pressure in conjunction with vacuum components according to an embodiment of the present invention. Object 610 and confocal/SPM system can be at atmospheric pressure even though other components such as mass spectrograph 628 need to be in a hard vacuum. For example, sampling pickup 624 can be imaged as a MEMS part made as shown in FIG. 6b and labeled as the drawing in FIG. 6a. By using techniques described in above-referenced patents and applications, sampling pickup 624 can deliver the sampled material through a very small sample tube whose volume at one atmosphere is too small to reduce the vacuum in the mass spectrometer as long as a vacuum pumping system continues to maintain the vacuum by removing at least an amount equivalent to a leak at $624 \sim (1 \text{ atmosphere})/10^{12}$ plus all other leaks in the system. Additionally, sampling pickup 624 and liquid supply 620 are shown in FIG. 6b as not having cover plates in place to close off the volumes and form a completed tube so that their interior structure is easier to discern. These cover plates could easily be implemented according to embodiments of the present invention.

Figure 7:
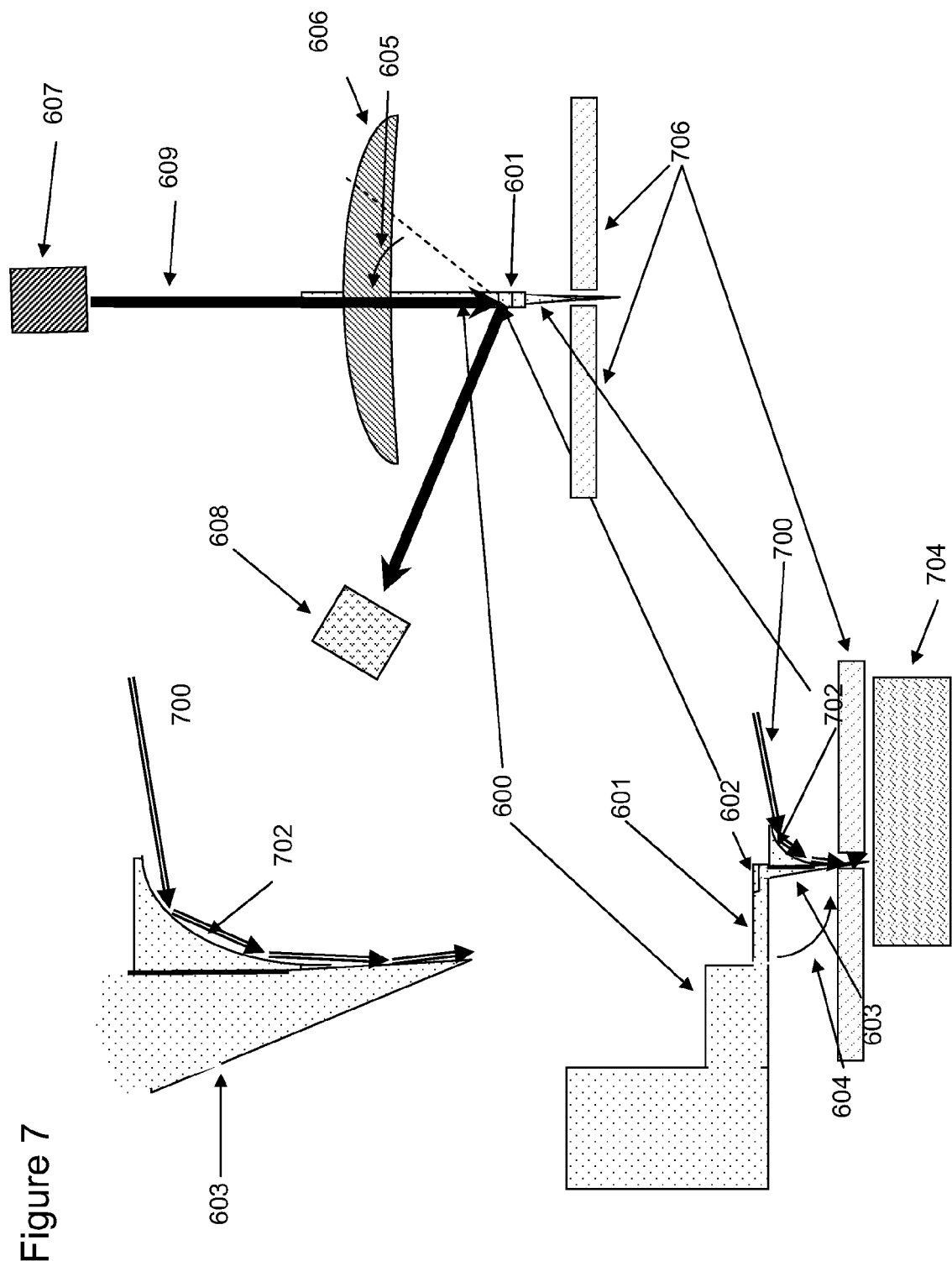
FIG. 7 is a side plan view, end view with objective optical lens and top view of the thin cantilever and tip construction that can be used as a glancing angle reflector according to an embodiment of the present invention.
Figure 7A:
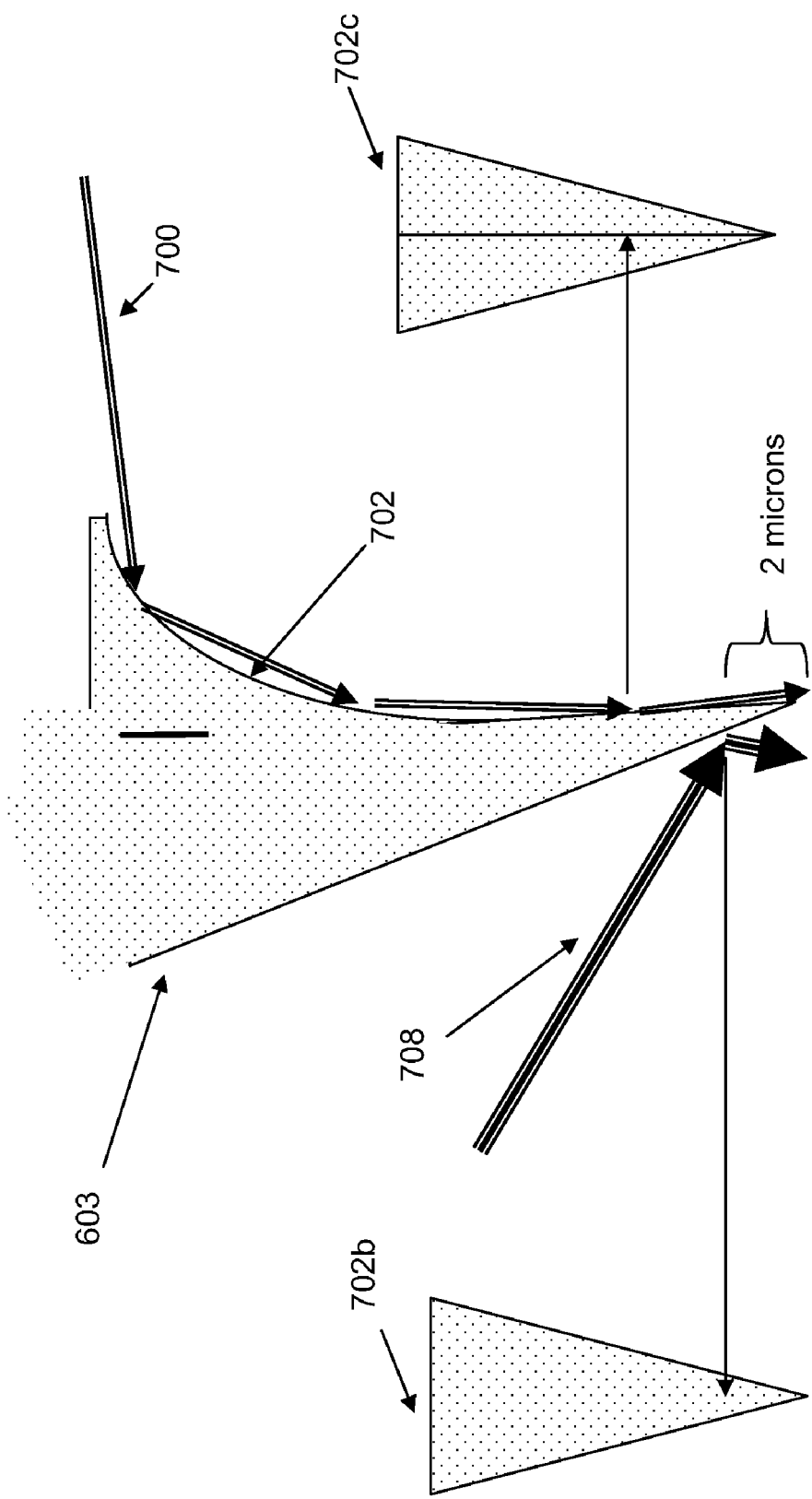
FIG. 7a is a side view of three different sides of a tip structure that may be reflectively used to displace material from the surface of an object using a light beam according to an embodiment of the present invention.
Figure 7B:
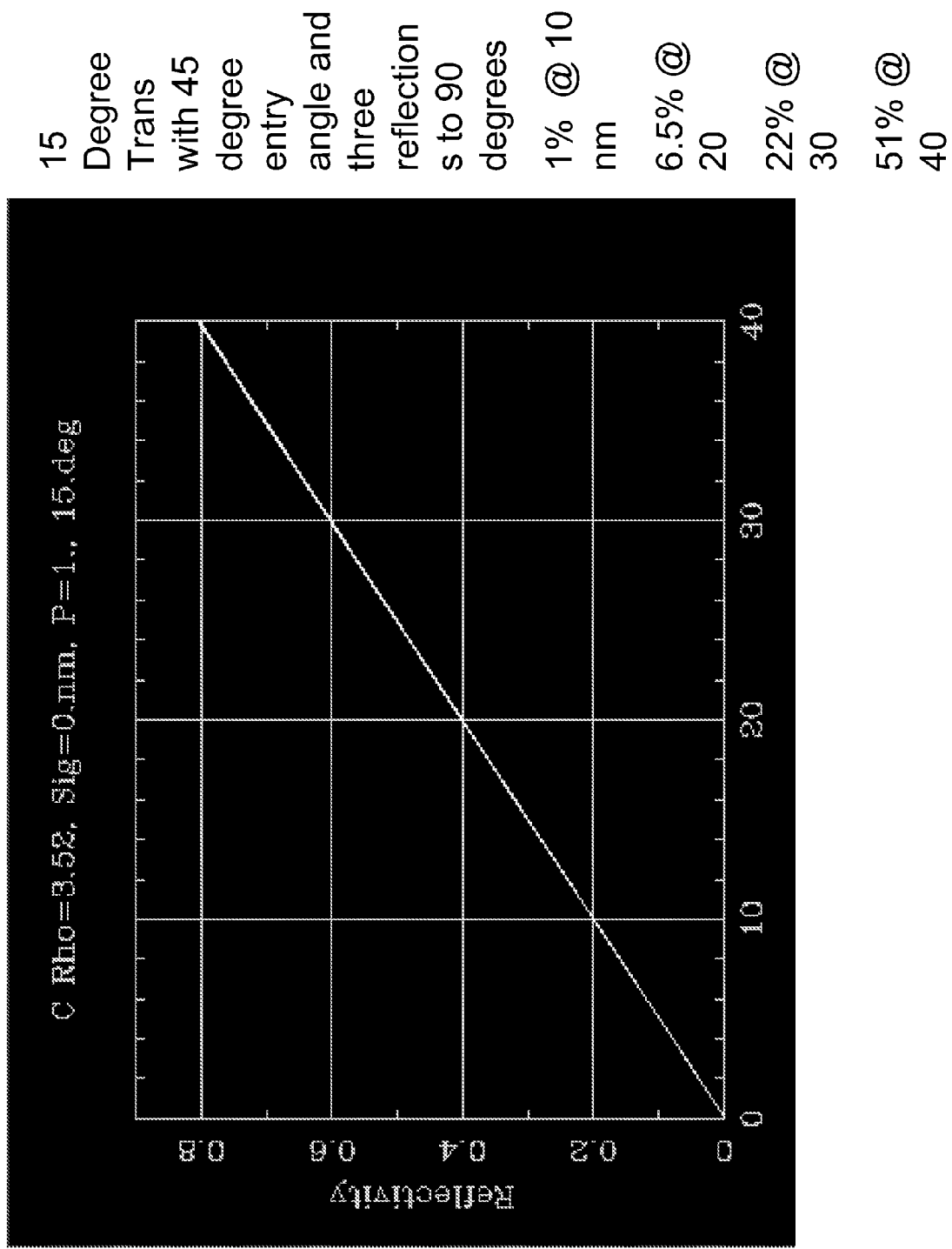
FIGS. 7b-7d are glancing angle tables for different angles of transmission according to embodiments of the present invention.
Figure 7C:
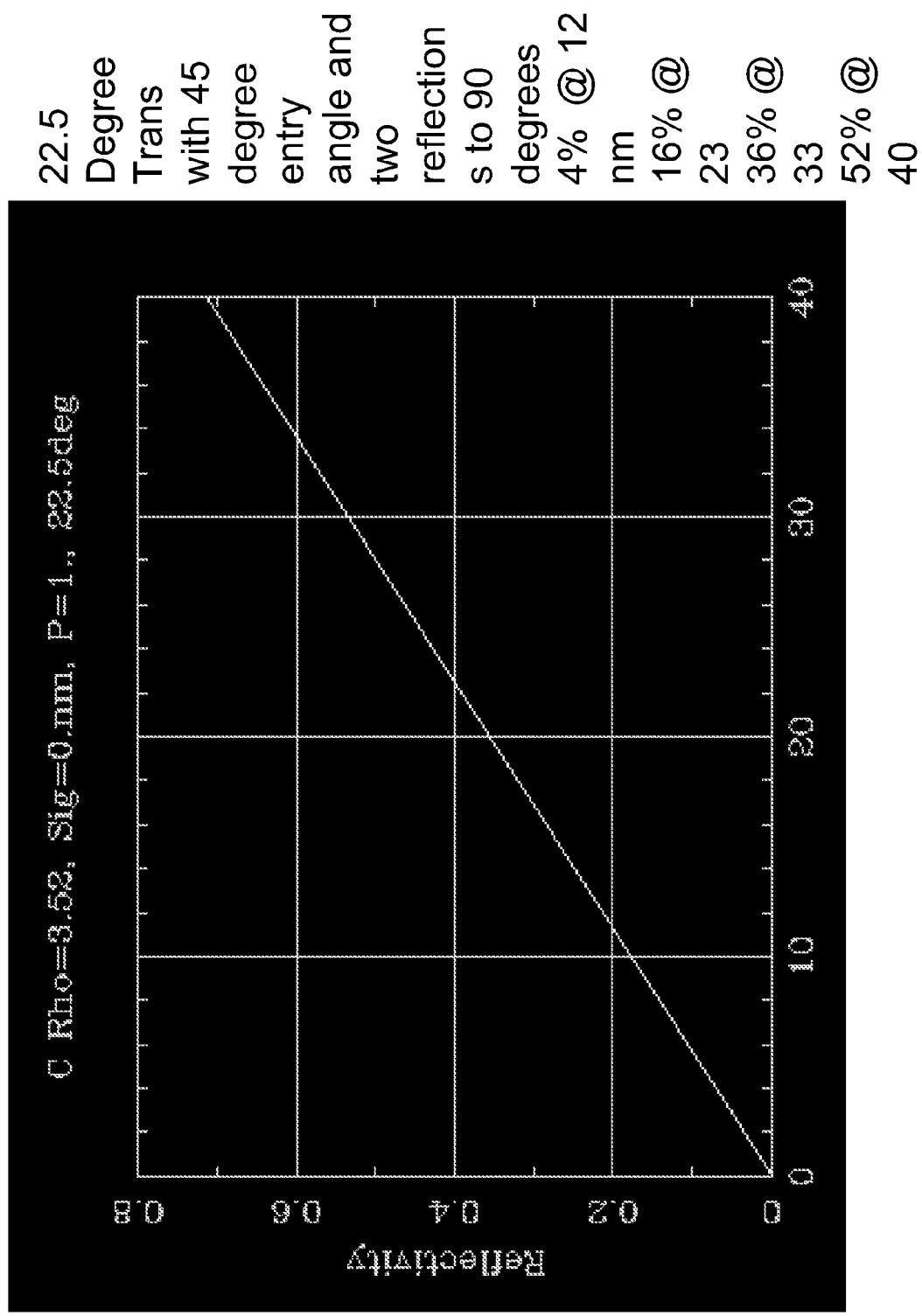
Figure 7D:
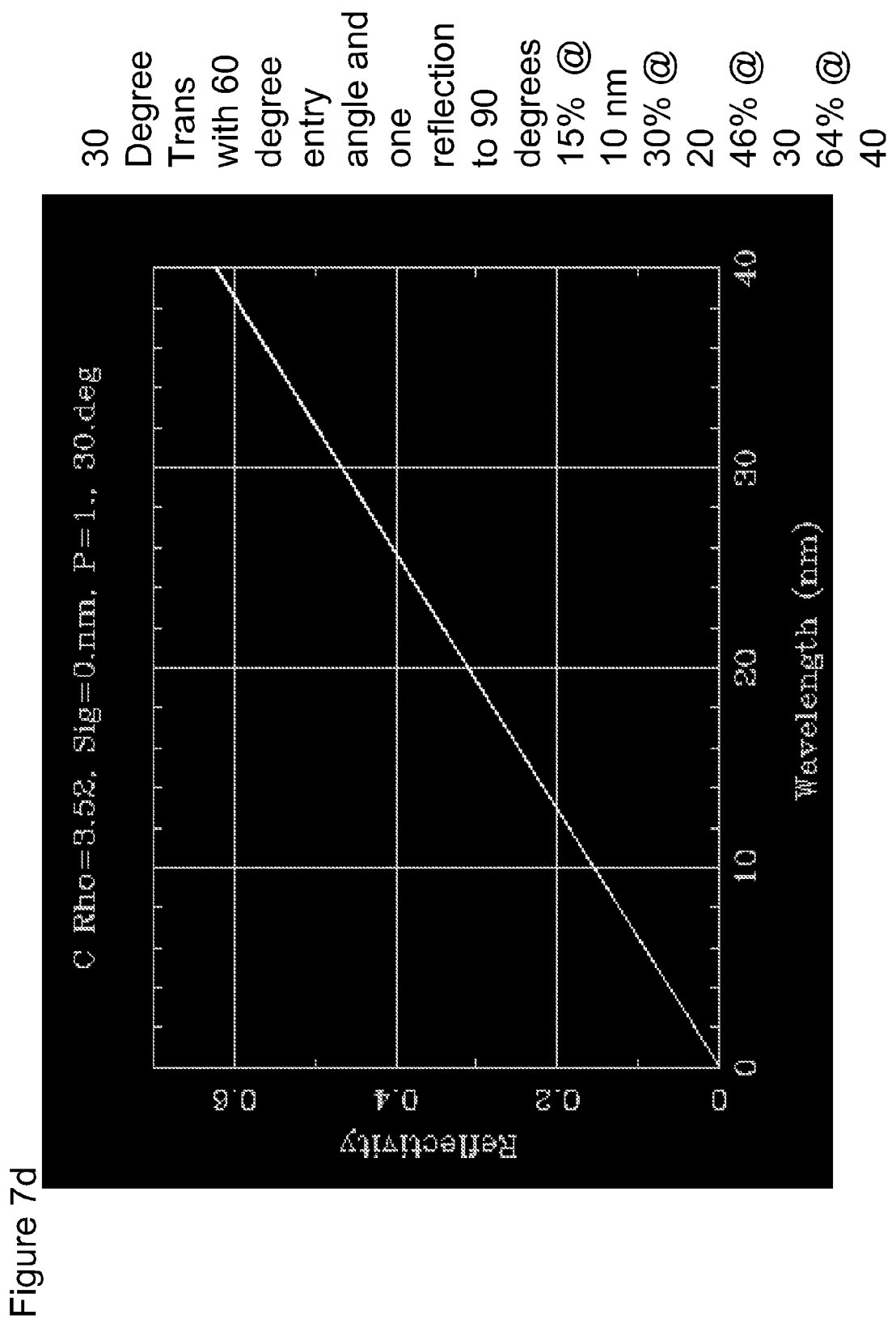
Figure 7E:
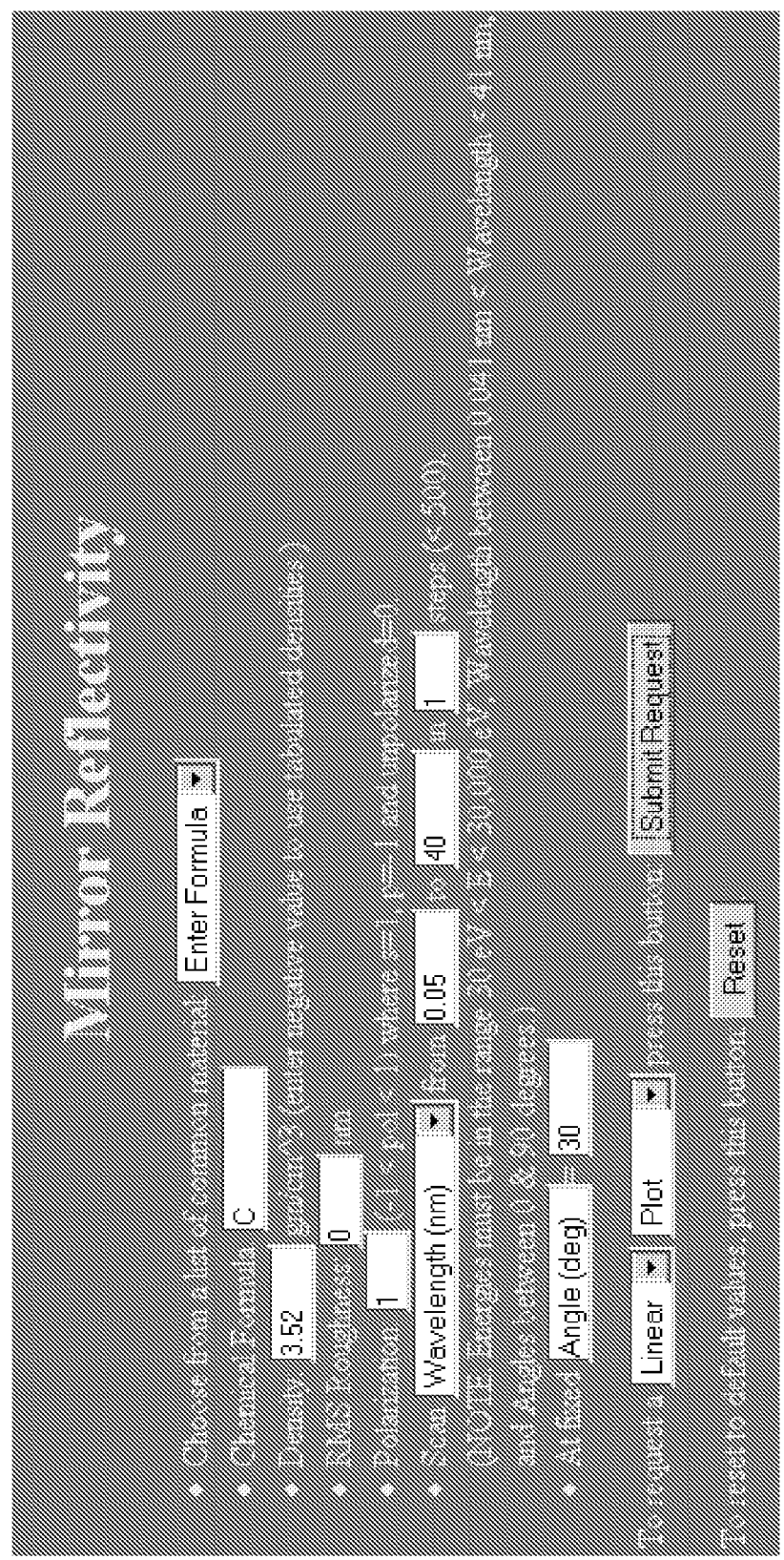
FIG. 7e is a source and parameter table showing reflectivity properties of different materials according to embodiments of the present invention.

FIG. 7 is a side plan view, end view (with objective optical lens) and top view of the thin cantilever and tip construction that can be used as a glancing angle reflector according to an embodiment of the present invention. In FIG. 7, a tip structure is shown which serves as a glancing angle reflector 702 for very short wavelength radiation 700 in the deep UV, or x-ray range by use of a suitable tip shape (702b and 702c as shown in FIG. 7a). A narrow reflecting surface is created which can send a small narrow spot to the object surface, where it may modify the surface or reveal the surface by electron and/or photon emission. It is well known to those of skill in the art that an obdurate tip material such as diamond, silicon carbide, silicon nitride or boron nitride can be brought to an edge only a few angstroms in width. Radiation from beam 700 can be reflected with little loss, as shown in glancing angle graphs 7b, 7c, 7d and source and parameter table 7e. The unreflected radiation in the beam is scattered away form the immediate surface or absorbed by absorptive plates 706 shown in FIG. 7. Plates 706 may be transparent to any range of light suitable for optical microscopy (e.g., 200 nm to 3 microns in wavelength) and placed to shield the object from the stray radiation. Thus, a precise intense beam of very short wavelength light can be accurately placed on the object near the tip which has also been used to scan the object. Finally, the back side of tip 603 may be used with a different short wavelength and/or intense light source 708 (shown in FIG. 7a) to place a larger spot on the object. Source 708 can deliver an amount of energy sufficient to modify or interact with the surface e,g, to produce detectable electrons and/or photons from the surface.

FIG. 7a is a side view of three different sides of a tip structure that may be reflectively used to displace material from the surface of an object using a light beam according to an embodiment of the present invention. For example, a suitably intense electromagnetic beam 708 reflected from the back 702b of three sided tip structure 702 and/or the small beam 700 reflected from the narrow front 702c of tip structure 702 may be used in conjunction with an e-beam and/or light beam to displace a larger region of material from the surface of the object. Additionally, the tip itself (as described in the above-referenced patents and applications) may be used to excavate or dig material from the surface in quantities and by volumes appropriate to its depth in the surface material and its shape in the directions of cutting or excavating material.

In FIGS. 8 through 11 are shown various forms of sample preparation suitable for creating or preparing sample objects for SEM, TEM, and atom probes such as LEAP (Local Electrode Atom Probe).

Figure 8:
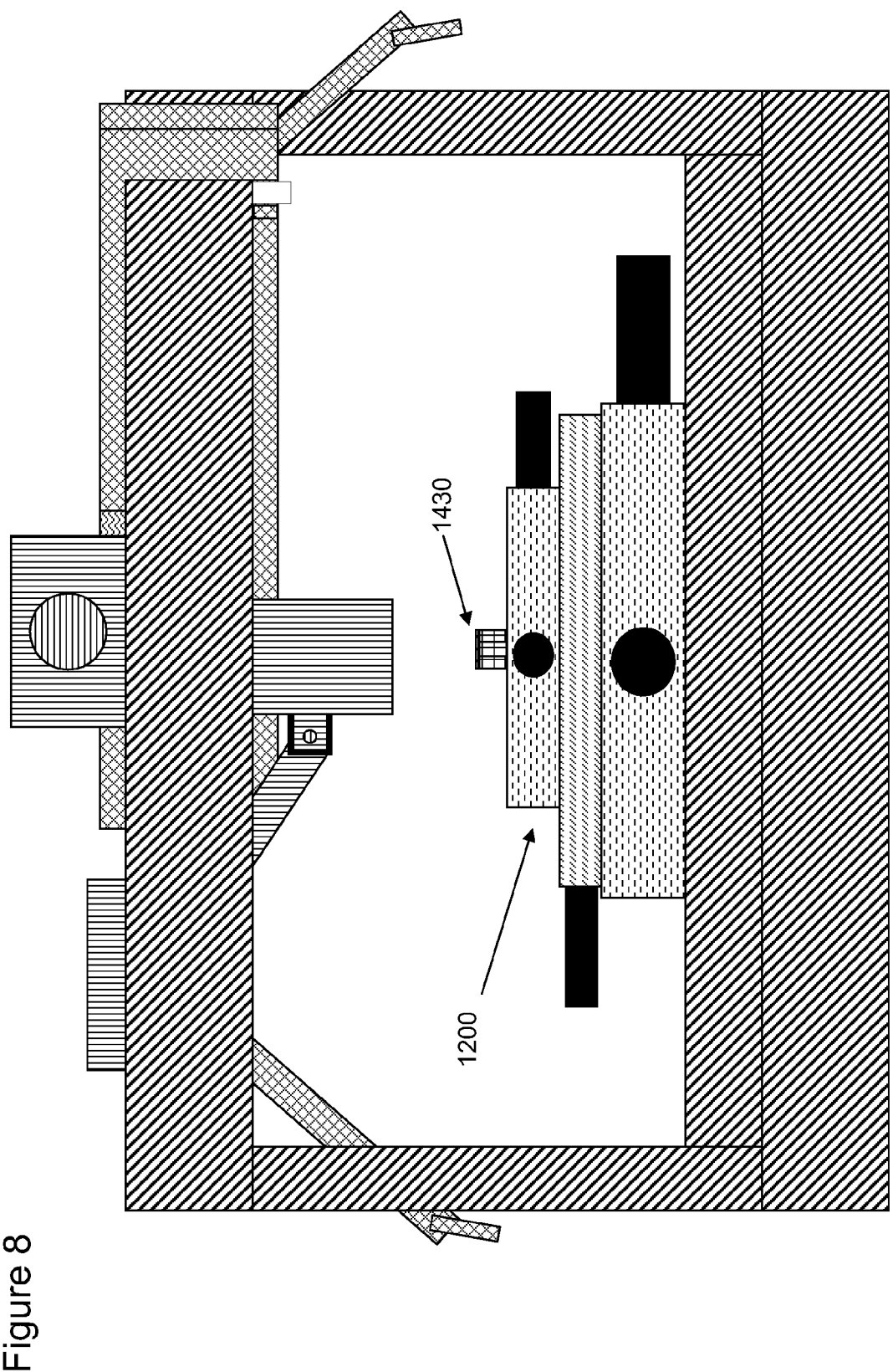
FIG. 8 is a side plan view of an exemplary attoscope incorporating an optic assembly and SPM module with an additional x-y stage according to an embodiment of the present invention.

FIG. 8 shows an Åscope with a LEAP sample holder 1430 mounted on the stage. After rough forming, each sample area 1431 in FIG. 10c (in the example there are 9 in three rows of three) is machined by the process of AFM Guided Nanomachining into its final form. An additional (x,y) stage 1200 as shown in FIG. 8 may also be incorporated to center some element of the sample (not shown) to the center of the axis of rotation.

Figure 8A:
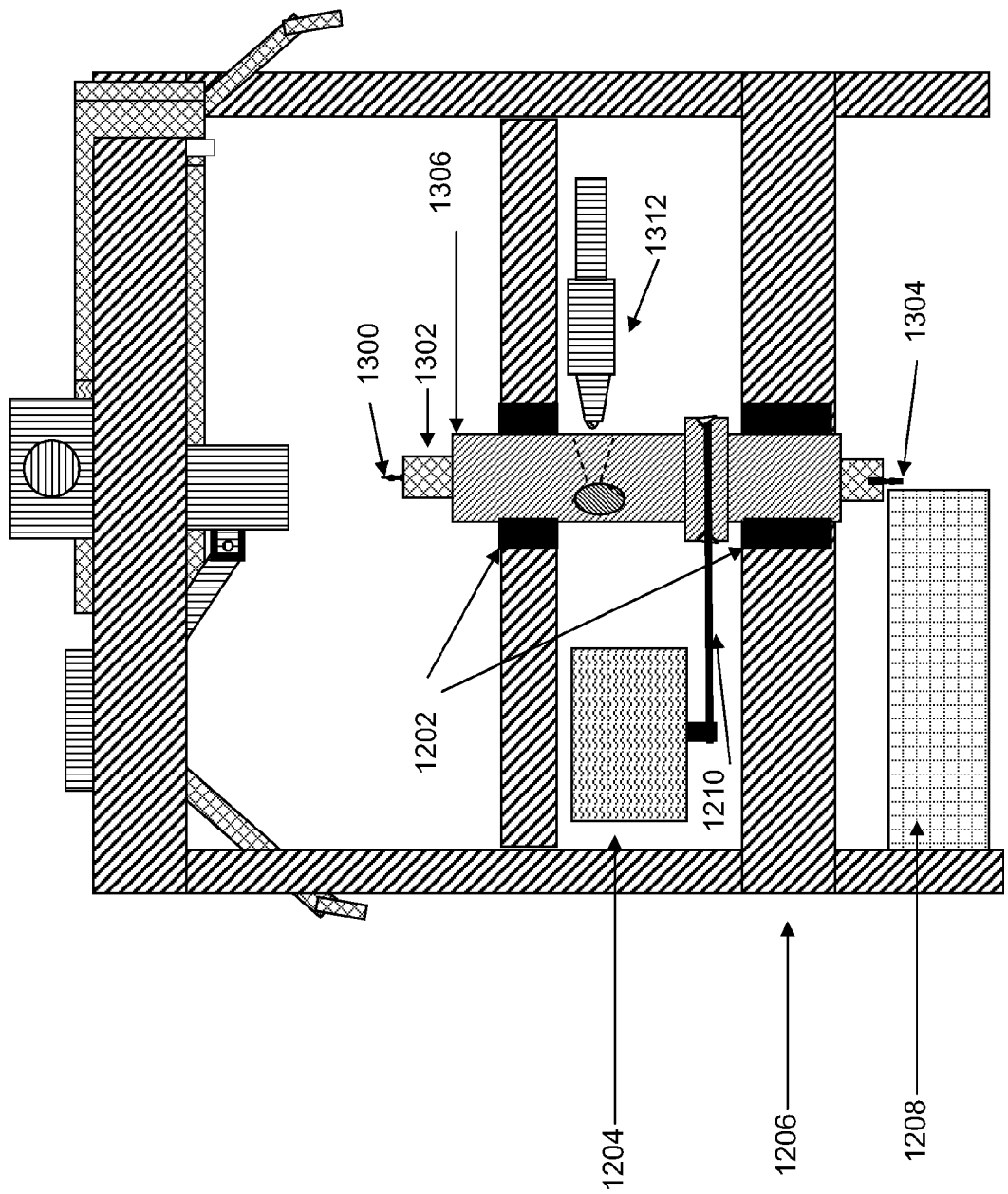
FIG. 8a is a side plan view of an exemplary attoscope which incorporates a tip that may remove material from a sample according to an embodiment of the present invention.

FIG. 8a is a side plan view of an exemplary attoscope which incorporates a tip that may remove material from a sample according to an embodiment of the present invention. In FIG. 8a, another Åscope is shown in which the single pointed sample 1300 in its LEAP holder 1302 is held by spindle 1306. This spindle can be rotated by servo motor 1204 acting on belt 1210 to rotate the spindle by any amount or it may be indexed by engaging ground tapers in the spindle with index pin 1312. The AFM with an appropriate tip is engaged after a confocal scan to remove a designated or preprogrammed amount and shape of material from the sample 1300. With the AFM/confocal head withdrawn, a shaping tool or lapping grinder 1208 may engage a rough sample 1304 spinning in the spindle (supported by precision sealed bearings 1202) to make a preformed shape 1300 in FIG. 9 on the sample part which is then transferred to the other end of the spindle to be held under the Åscope head for final finishing.

Figure 9:
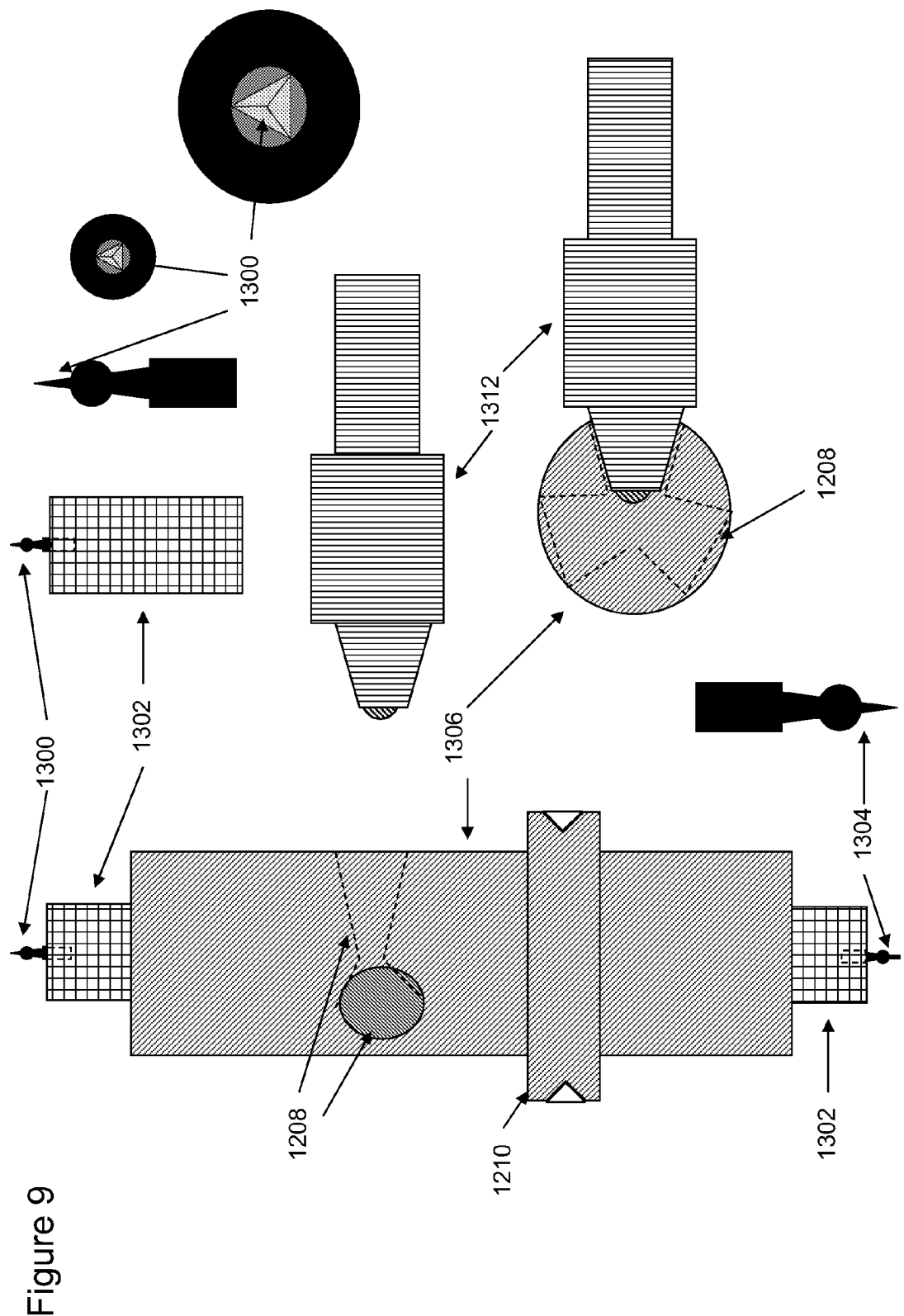
FIG. 9 is a side close-up view of a spindle and possible final shape of a sample used in conjunction with an attoscope according to an embodiment of the present invention.

FIG. 9 shows spindle 1306 and one possible final shape (three sided pyramid) of a sample 1300 along with details of index pin 1312.

Figure 10:
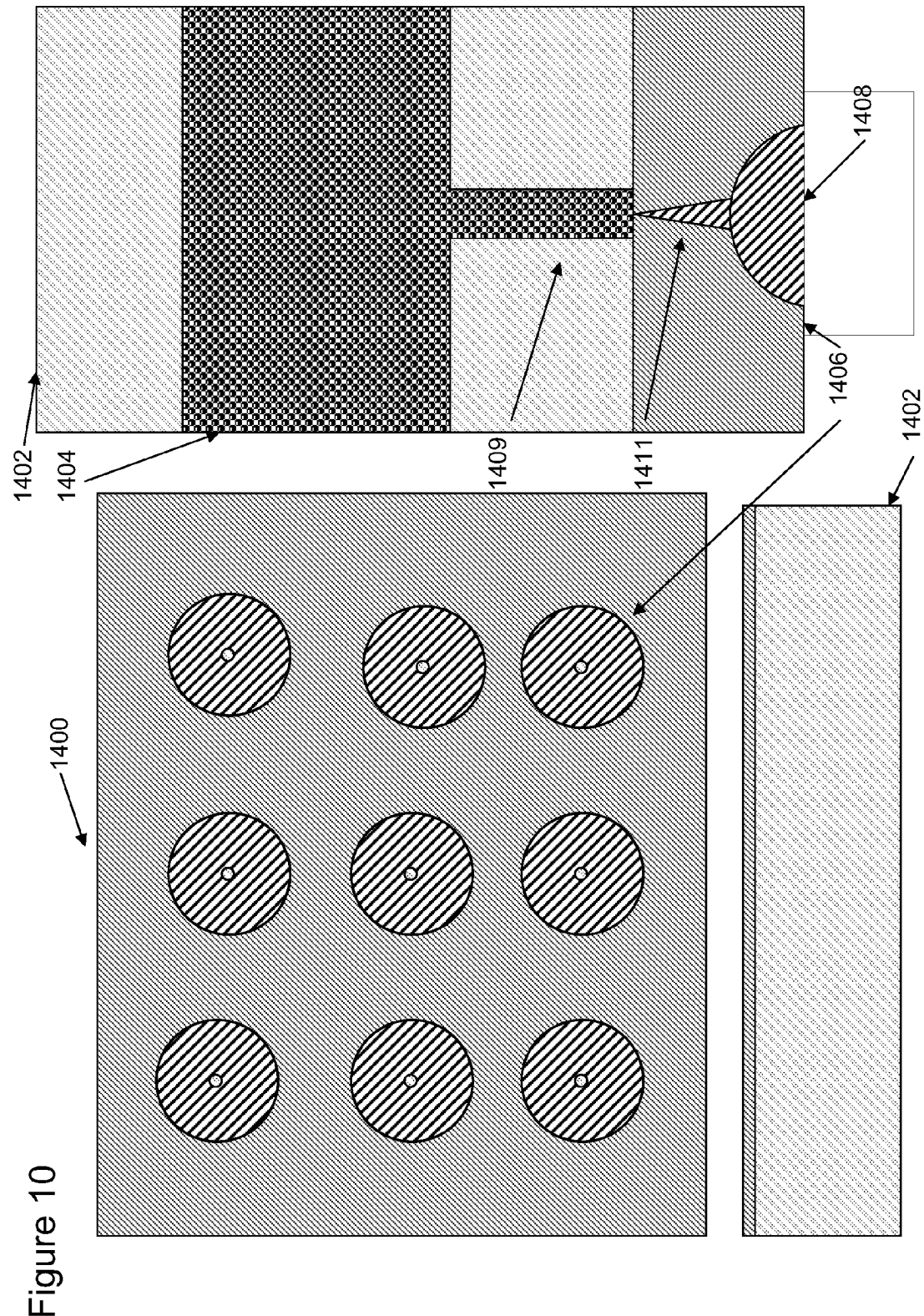
FIG. 10 is a top, side perspective, and side cross-sectional view of a roughing tool which can be used to prepare material for LEAP analysis according to an embodiment of the present invention.

FIG. 10 shows some views of a roughing tool which prepares conductive and semiconductive material for LEAP analysis using a copper or graphite plate 1400, 1406 and copper backing 1402. Copper backing 1402 incorporates a water jacket 1404 with water jacket through-hole connections 1409 to the sample chambers 1408. For example, the through-holes can be about 2 to 20 microns. The sample chamber 1408 may be made by machining into the face of the plate 1406 a negative form of the sample shape to be made. Methods other than machining may also be used to create the negative form. The negative form includes a very small through hole connection 1411 to the water jacket through hole 1409.

Figure 10A:
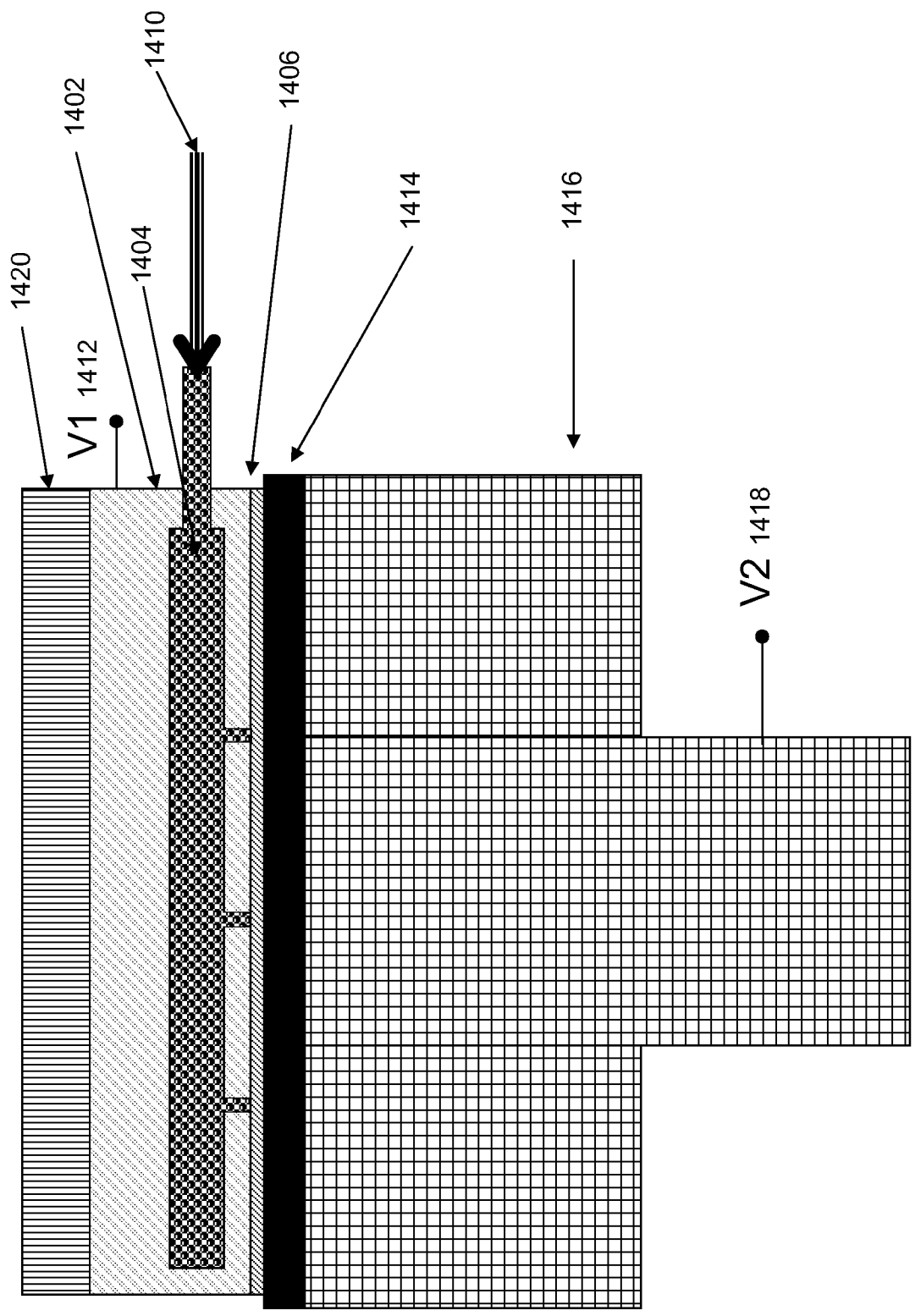
FIG. 10a is a side cross-sectional view of the roughing tool shown in FIG. 10 in operation according to an embodiment of the present invention.

FIG. 10*a* is a side cross-sectional view of the roughing tool shown in FIG. 10 in operation according to an embodiment of the present invention. As shown in FIG. 10*a*, the entire structure of FIG. 10 can be sandwiched between a device 1420 (such as a piezoelectric stack with 100 to 200 microns of total travel) for feeding the assembly into a stack consisting of sample 1414 and holder base 1416. A constant flow of dielectric fluid 1410 such as deionized water is fed into water jacket 1404 through a supply line (not shown) while a voltage is maintained between electrical connection V1 1412 and V2 1418 such that material is removed in bulk by this action. The basic machining process is well known in the art as Electrical Discharge Machining or EDM.

Figure 10B:
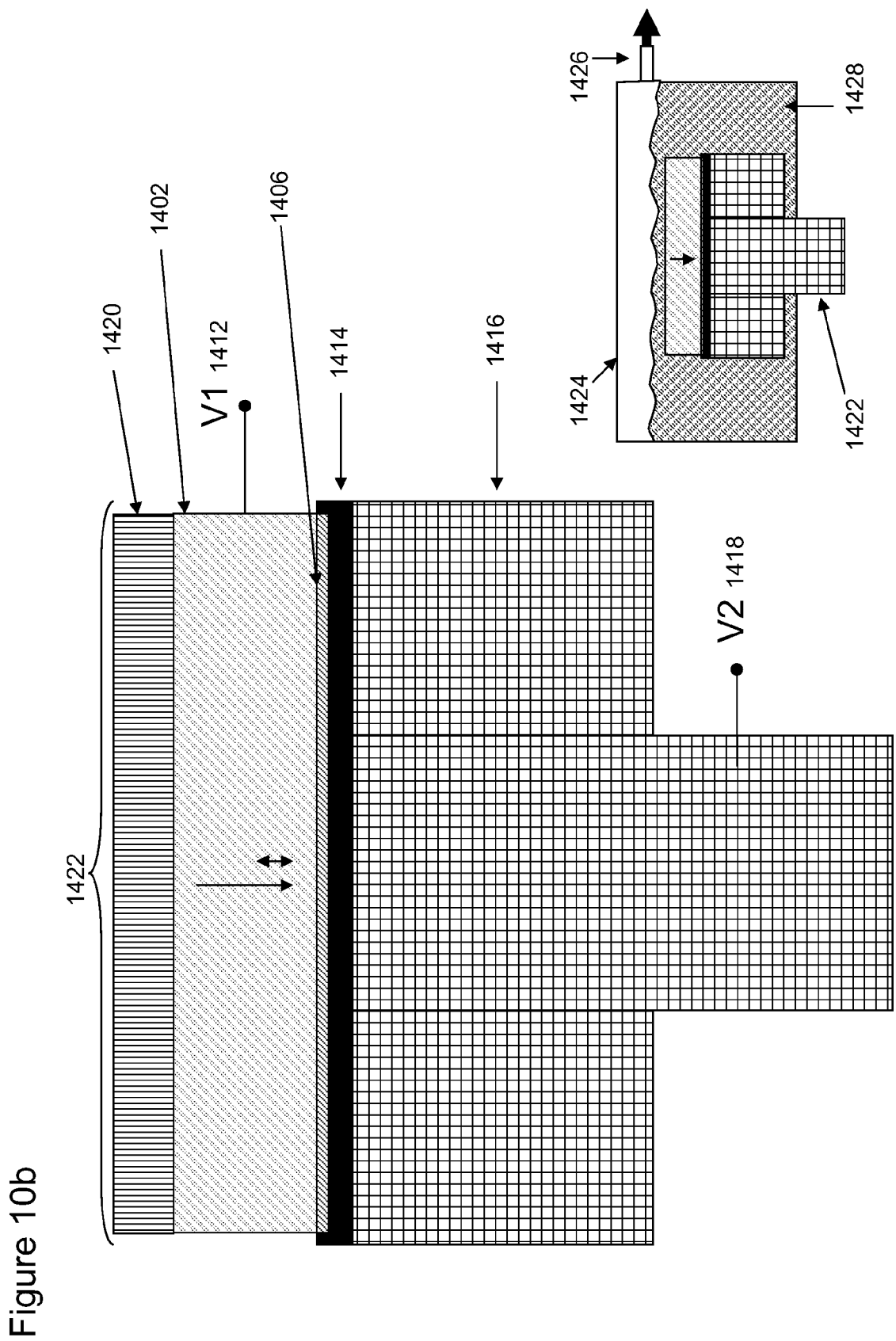
FIG. 10b shows two side perspective views of the roughing tool shown in FIG. 10 in operation according to an embodiment of the present invention.

FIG. 10*b* shows two side views of the roughing tool shown in FIG. 10 in operation according to an embodiment of the present invention. The entire assembly 1422 can be immersed in a bath 1424 of the dielectric fluid and a pulsing motion may also be used to move the assembly from FIG. 10 into and away from the surface 1414 to be machined and also to bring in and expel dielectric fluid. The negative shape 1408 creates a positive shape in the sample 1414 except at through hole 1409, through which a positive pressure of dielectric fluid insures that no machining will take place at the very top of the sample plate 1414 in through hole 1409. This process continues in FIG. 10*b* until the small rod like shape formed at the through hole reaches the desired length or the sample depth limit is reached.

Figure 10C:
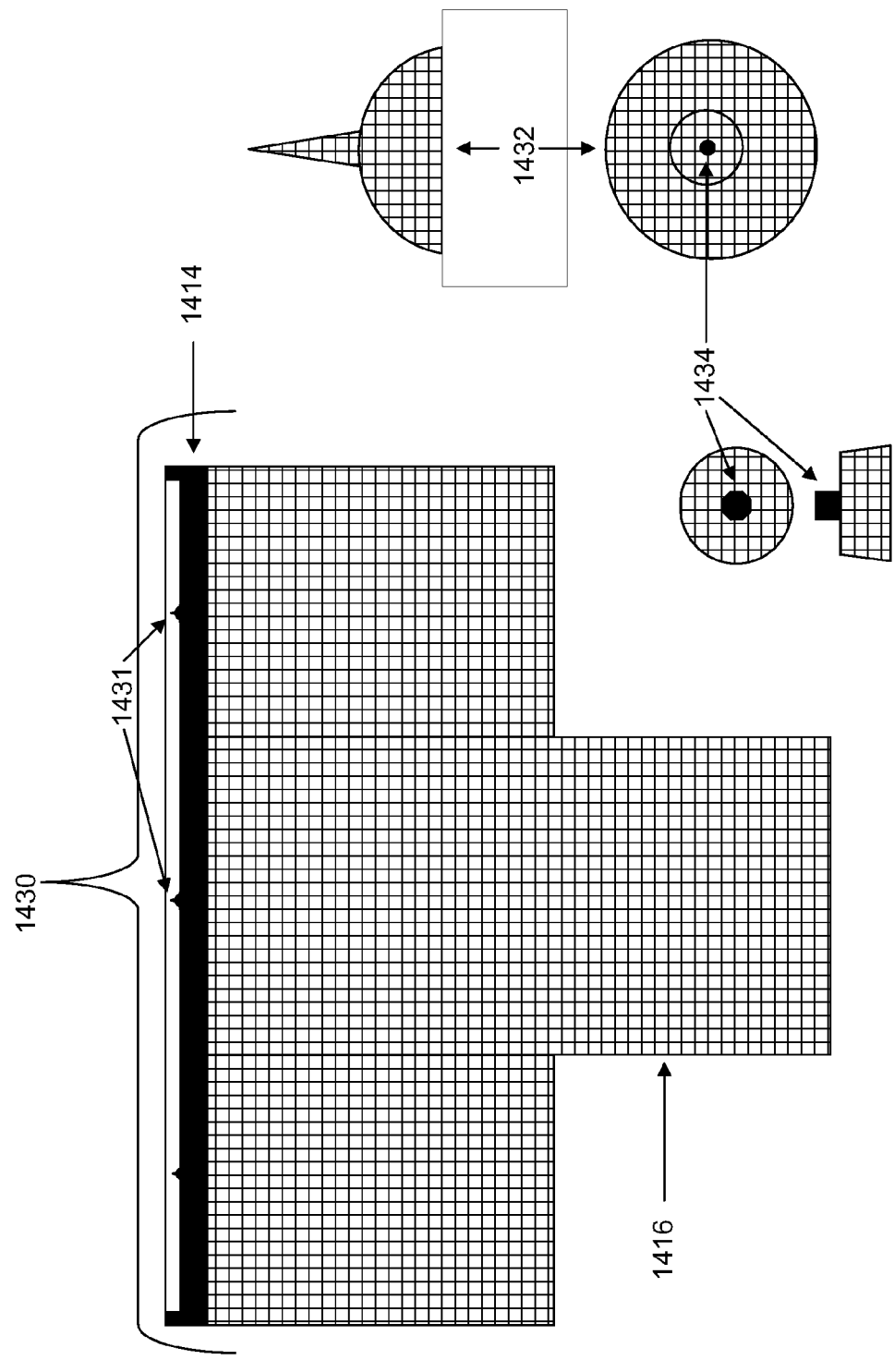
FIG. 10c is shows a side perspective view of a holder base and sample which can be nanomachined into a shape and treated to form nanotubes according to an embodiment of the present invention.

FIG. 10*c* shows a side perspective view of a holder base and sample which can be nanomachined into a shape and treated to form nanotubes according to an embodiment of the present invention. As shown in FIG. 10*c*, sample 1414 may be copper-plated with a thin 100 to 200 nanometer film of nickel (or iron). The resulting form 1432 has a small nickel layer 1434 at the very top of the shaft which can be nanomachined if necessary by the Åscope to a polygonal shape 1434 with a precise width as shown in FIG. 10*c*.

Figure 11:
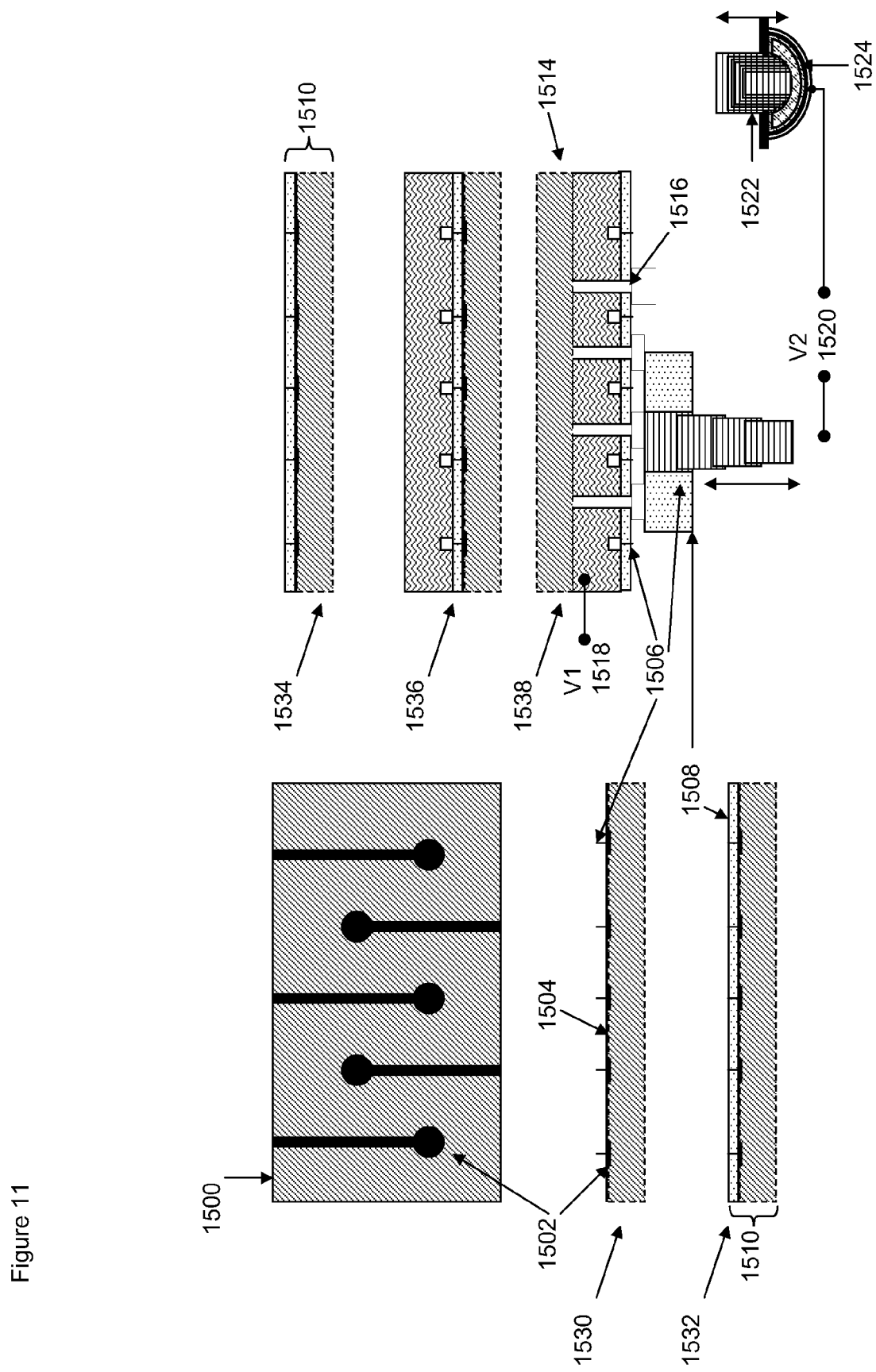
FIG. 11 is a series of side views of a nanotube fabrication process according to an embodiment of the present invention.
Figure 11B:
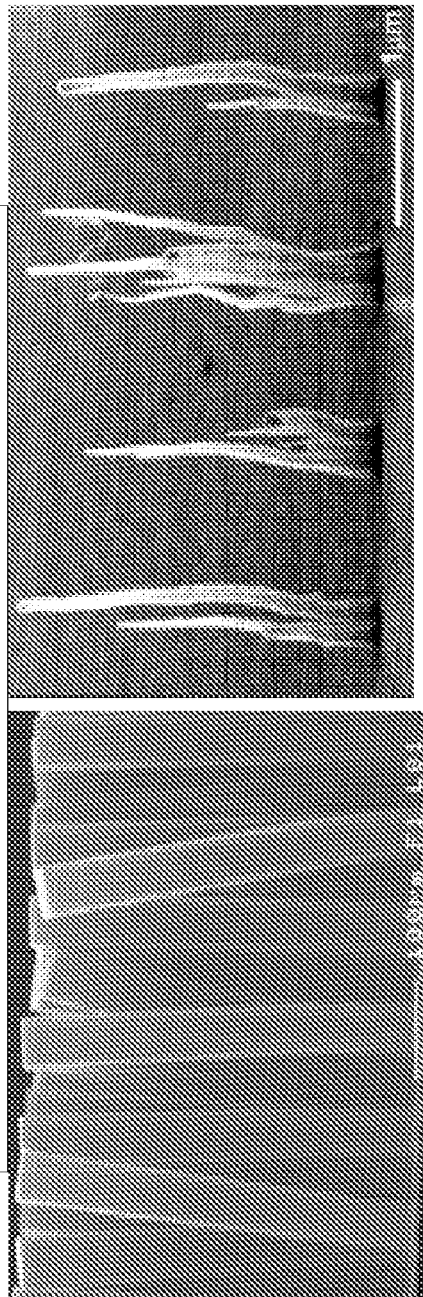

FIG. 11 is a series of side views of a nanotube fabrication process according to an embodiment of the present invention. A nickel element or a similar nub-like element 1502, 1506 may be placed in a CVD reactor, and one or more nanotubes of praphene carbon or boron nitride can be grown on the nickel (or iron) 1500 as is well known in the art (see FIGS. 11*a* and 11*b*) as shown at 1530. A layer of gold 1508 or other Nobel metal may be deposited around the nanotubes. The combined layer 1510 including the nickel growth layer, nanotubes, and gold layer is shown at 1532. The layer may be planarized in 1534 to remove the end caps on the nanotubes and bonded to a gold-coated copper mounting plate with recesses above the nanotubes, as shown at 1536. The original sample material may now be removed by chemical etching and the exposed surface planarized to remove the nanotube caps on the exposed side as shown at 1538. This assembly may then be attached to an electrically insulating mount 1514 which is in turn is attached to a LEAP sample holder (not shown), and the gold-covered copper substrate can be electrically divided by a cutting operation into individual electrical regions 1516. If multiwalled, the nanotube is now free to telescope outward as shown in 1506 from the effect of an external electrical field 1520, similar to the field created by the LEAP instrument on the sample.

While the above is a complete description of specific embodiments of the invention, the above description should not be taken as limiting the scope of the invention as defined by the claims.

What is claimed is:

1. A method of collecting measurement data regarding an object of interest comprising:
    positioning the object of interest upon a sample stage, the sample stage adapted to hold the object of interest;
    characterizing at least one surface of the object of interest to form one or more height maps of the object of interest; and
    tiling all or part of a surface of the object of interest utilizing the height maps, the tiling performed such that any view normal to a tiling height map may be obtained by viewing an individual height map and the entire surface and interior elements may be viewed by summing together the height maps.

2. The method of claim 1 wherein the height maps are formed by:
    illuminating the object of interest with at least three illumination sources arranged at different angles with respect to the plane of the sample stage, each illumination source creating a shadow of the object of interest, and
    utilizing shadow information from the shadows of the object of interest to form the one or more height maps of the object of interest.

3. The method of claim 2 wherein the tiling is performed such that any Fourier transform, power spectrum, roughness measure, wavelet or similar technique for manipulating, filtering and sorting data from the spatial domain to the frequency domain and their inverses that could be used on an individual height map may be used on the surface or portion thereof including an interpolated height map and may be summed together to obtain characteristics of the entire surface of the object of interest including interior elements.

4. The method of claim 2 wherein the tiling is performed such that any surface measuring, shape embedding, cursor embedding or cross section technique that could be used on an individual height map may be used on the surface or portion thereof including an interpolated height map and summed together to obtain an overall effect across the entire surface.

5. A method of collecting measurement data regarding an object of interest comprising:
    tiling all or part of a surface of the object of interest utilizing the height maps, the tiling performed such that any view off normal to a tiling height map may be obtained by interpolating and projecting between adjacent height maps; and
    calculating an absolute position of the element with respect to a second element utilizing the one or more height maps.

6. The method of claim 5 wherein the height maps are formed by:
   illuminating the object of interest with at least three illumination sources arranged at different angles with respect to the plane of the sample stage, each illumination source creating a shadow of the object of interest; and
   utilizing shadow information from the shadows of the object of interest to form the one or more height maps of the object of interest.

7. A method of collecting measurement data regarding an object of interest comprising:
   tiling all or part of a surface of the object of interest utilizing the height maps, the tiling performed such that any filter or other matrix operator that could be used on an individual height map may be used on the surface or portion thereof including an interpolated height map and interior elements; and
   calculating an absolute position of the element with respect to a second element utilizing the one or more height maps.

8. The method of claim 7 wherein the height maps are formed by:
   illuminating the object of interest with at least three illumination sources arranged at different angles with respect to the plane of the sample stage, each illumination source creating a shadow of the object of interest; and
   utilizing shadow information from the shadows of the object of interest to form the one or more height maps of the object of interest.

* * * * *